United States Patent
Centonza et al.

(10) Patent No.: US 9,538,523 B2
(45) Date of Patent: *Jan. 3, 2017

(54) METHODS RECEIVING RADIATION PATTERN INFORMATION AND RELATED NETWORK NODES AND BASE STATIONS

(71) Applicant: Telefonaktiebolaget L M Ericsson (publ), Stockholm (SE)

(72) Inventors: Angelo Centonza, Winchester (GB); Thomas Chapman, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 3 days.

This patent is subject to a terminal disclaimer.

(21) Appl. No.: 14/418,326

(22) PCT Filed: Aug. 28, 2014

(86) PCT No.: PCT/SE2014/050990
§ 371 (c)(1),
(2) Date: Jan. 29, 2015

(87) PCT Pub. No.: WO2016/032378
PCT Pub. Date: Mar. 3, 2016

(65) Prior Publication Data
US 2016/0066312 A1   Mar. 3, 2016

(51) Int. Cl.
*H04W 72/04*   (2009.01)
*H04W 16/08*   (2009.01)
(Continued)

(52) U.S. Cl.
CPC ........ *H04W 72/0426* (2013.01); *H04W 16/08* (2013.01); *H04W 52/04* (2013.01);
(Continued)

(58) Field of Classification Search
None
See application file for complete search history.

(56) References Cited

U.S. PATENT DOCUMENTS 6,535,742 B1 *   3/2003   Jiang ............... H04W 16/04
                                                    455/444
7,664,492 B1 *   2/2010   Lee ................. H04W 16/28
                                                    455/422.1
(Continued)

FOREIGN PATENT DOCUMENTS

CN      102111792        6/2011
EP      1 694 091 A2     8/2006
(Continued)

OTHER PUBLICATIONS

3GPP TS 36.300 V11.4.0 (Dec. 2012) "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 650 Route des Lucioles, Sophia Antipolis, Valbonne, France; 208 pages.

(Continued)

*Primary Examiner* — Bunjob Jaroenchonwanit
(74) *Attorney, Agent, or Firm* — Myers Bigel, P.A.

(57) ABSTRACT

Methods may be provided to operate a first node in a radio access network including a plurality of base stations. For example, radiation pattern information for a radio access network transmission may be received from a second node. Moreover, the radiation pattern information may include an indication of power and an indication of direction associated with the indication of power for the radio access network transmission. Related network nodes and base stations are also discussed.

29 Claims, 14 Drawing Sheets

(51) Int. Cl.
*H04W 52/04* (2009.01)
*H04W 16/28* (2009.01)
*H04W 36/22* (2009.01)
*H04W 92/20* (2009.01)
*H04W 52/14* (2009.01)
*H04W 52/42* (2009.01)

(52) U.S. Cl.
CPC ..... *H04W 72/046* (2013.01); *H04W 72/0473* (2013.01); *H04W 16/28* (2013.01); *H04W 36/22* (2013.01); *H04W 52/143* (2013.01); *H04W 52/42* (2013.01); *H04W 92/20* (2013.01)

(56) References Cited

U.S. PATENT DOCUMENTS

| | | | | |
|---|---|---|---|---|
| 8,229,668 B2* | 7/2012 | Kawauchi | G01S 5/0072 | 701/414 |
| 8,422,943 B2* | 4/2013 | Saito | H04B 7/15507 | 455/11.1 |
| 8,467,351 B2* | 6/2013 | Liu | H04W 36/0094 | 370/332 |
| 8,472,956 B2* | 6/2013 | Wang | H04W 4/08 | 455/436 |
| 8,744,449 B2* | 6/2014 | Song | H04W 36/0083 | 370/331 |
| 9,031,564 B2* | 5/2015 | Teyeb | H04W 36/0083 | 455/422.1 |
| 9,072,038 B2* | 6/2015 | Salvador | H04W 48/20 | |
| 9,215,058 B2 | 12/2015 | Heo et al. | | |
| 2001/0012778 A1* | 8/2001 | Eriksson | H04W 28/08 | 455/436 |
| 2003/0119501 A1 | 6/2003 | Kim | | |
| 2005/0053046 A1* | 3/2005 | Wang | H04L 12/4645 | 370/338 |
| 2005/0107108 A1* | 5/2005 | Hamalainen | H04W 52/267 | 455/522 |
| 2005/0277443 A1 | 12/2005 | Ozluturk | | |
| 2006/0056345 A1* | 3/2006 | Marinier | H04W 16/28 | 370/329 |
| 2006/0128394 A1 | 6/2006 | Turina et al. | | |
| 2006/0166690 A1* | 7/2006 | Nishio | H04W 52/322 | 455/522 |
| 2007/0153935 A1* | 7/2007 | Yang | H04B 7/0669 | 375/267 |
| 2010/0061356 A1* | 3/2010 | Qvarfordt | H04J 11/0093 | 370/338 |
| 2010/0128621 A1* | 5/2010 | Hamabe | H04W 68/02 | 370/252 |
| 2010/0298022 A1* | 11/2010 | Karim | H04W 24/02 | 455/522 |
| 2011/0002283 A1* | 1/2011 | Drugge | H04B 1/7103 | 370/329 |
| 2011/0244899 A1* | 10/2011 | Li | H04W 76/023 | 455/501 |
| 2011/0250927 A1* | 10/2011 | Nakada | H04W 52/50 | 455/525 |
| 2011/0256880 A1* | 10/2011 | Golaup | H04W 28/08 | 455/453 |
| 2012/0155291 A1 | 6/2012 | Koivisto et al. | | |
| 2012/0195238 A1* | 8/2012 | Li | H04W 36/0016 | 370/280 |
| 2012/0220329 A1* | 8/2012 | Kitazoe | H04W 48/12 | 455/515 |
| 2012/0244898 A1* | 9/2012 | Guey | H04W 24/02 | 455/507 |
| 2012/0270553 A1* | 10/2012 | Ha | H04W 36/22 | 455/438 |
| 2012/0307697 A1 | 12/2012 | Mukhopadhyay | | |
| 2013/0109420 A1* | 5/2013 | Nilsson | H04B 7/024 | 455/501 |
| 2013/0130670 A1* | 5/2013 | Samdanis | H04W 24/02 | 455/418 |
| 2013/0182638 A1* | 7/2013 | Zhou | H04B 7/155 | 370/315 |
| 2013/0194950 A1* | 8/2013 | Haghighat | H04W 24/02 | 370/252 |
| 2013/0301423 A1* | 11/2013 | Sirotkin | H04W 76/048 | 370/241.1 |
| 2013/0310043 A1* | 11/2013 | Bakker | H04W 36/22 | 455/436 |
| 2014/0029534 A1* | 1/2014 | De Pasquale | H04W 24/08 | 370/329 |
| 2014/0177492 A1* | 6/2014 | Sun | H04L 5/0094 | 370/280 |
| 2014/0198659 A1* | 7/2014 | Vargas Bautista | H04W 28/08 | 370/236 |
| 2014/0199983 A1* | 7/2014 | Bergstrom | H04W 8/20 | 455/418 |
| 2014/0220979 A1* | 8/2014 | Song | H04W 36/0083 | 455/436 |
| 2014/0274195 A1* | 9/2014 | Singh | H04W 52/241 | 455/522 |
| 2014/0293888 A1* | 10/2014 | Oh | H04W 72/0486 | 370/329 |
| 2015/0029912 A1* | 1/2015 | Park | H04L 5/14 | 370/280 |
| 2015/0036663 A1* | 2/2015 | Kilpatrick, II | H04W 36/0083 | 370/332 |
| 2015/0092751 A1* | 4/2015 | Vargas Bautista | H04W 28/08 | 370/331 |
| 2015/0109971 A1* | 4/2015 | Wei | H04L 5/0098 | 370/280 |
| 2015/0163690 A1* | 6/2015 | Pani | H04W 24/10 | 370/252 |
| 2015/0181546 A1 | 6/2015 | Freda et al. | | |
| 2015/0304889 A1* | 10/2015 | Qian | H04W 72/1289 | 370/235 |
| 2015/0319774 A1* | 11/2015 | Cai | H04W 72/14 | 370/329 |
| 2015/0327324 A1* | 11/2015 | Wei | H04W 52/0235 | 370/280 |
| 2015/0349942 A1* | 12/2015 | Chatterjee | H04W 28/02 | 370/280 |
| 2015/0350944 A1* | 12/2015 | Chen | H04W 24/10 | 370/252 |
| 2015/0358887 A1* | 12/2015 | Xu | H04W 36/32 | 455/436 |
| 2015/0365968 A1* | 12/2015 | Kim | H04B 7/2656 | 370/280 |
| 2015/0372871 A1* | 12/2015 | Zang | H04L 12/66 | 398/41 |
| 2015/0381421 A1* | 12/2015 | Brisebois | H04L 41/0806 | 455/418 |

FOREIGN PATENT DOCUMENTS

| | | |
|---|---|---|
| EP | 1 978 769 A1 | 10/2008 |
| EP | 2 257 085 A1 | 12/2010 |
| GB | 2 299 916 A | 10/1996 |
| WO | WO 2008/030171 A2 | 3/2008 |
| WO | WO 2009/011640 A2 | 1/2009 |
| WO | WO 2009/120127 | 10/2009 |
| WO | WO 2010/050885 A1 | 5/2010 |
| WO | WO 2012/152306 A1 | 11/2012 |
| WO | WO 2013/048331 A1 | 4/2013 |
| WO | WO 2013/061231 A1 | 5/2013 |
| WO | WO 2014/163553 A1 | 10/2014 |

OTHER PUBLICATIONS

3GPP TS 36.331 V11.2.0 (Dec. 2012) "3$^{rd}$ Generation Partnership Project; Technical Specification Group Radio Access Network; Evolved Universal Terrestrial Radio Access (E-UTRA); Radio Resource Control (RRC); Protocol specification (Release 11)", 650 Route des Lucioles, Sophia Antipolis, Valbonne, France; 340 pages.

(56) References Cited

OTHER PUBLICATIONS

3GPP TS 36.423 V11.3.0 (Dec. 2012) "3$^{rd}$ Generation Partnership Project; Technical Specification Group Radio Access Network; Evolved Universal Terrestrial Radio Access Network (E-UTRAN); X2 application protocol (X2AP); (Release 11)", 650 Route des Lucioles, Sophia Antipolis, Valbonne, France; 141 pages.
3GPP TS 36.423 V12.0.0 (Dec. 2013) "3$^{rd}$ Generation Partnership Project; Technical Specification Group Radio Access Network; Evolved Universal Terrestrial Radio Access Network (E-UTRAN); X2 application protocol (X2AP); (Release 12)", 650 Route des Lucioles, Sophia Antipolis, Valbonne, France; 144 pages.
3GPP TR 37.822 V12.0.0 (Jun. 2014) "3$^{rd}$ Generation Partnership Project; Technical Specification Group Radio Access Network; Study on next generation Self-Optimizing Network (SON) for UTRAN and E-UTRAN (Release 12)", 650 Route des Lucioles, Sophia Antipolis, Valbonne, France; 19 pages.
Nokia Siemens Networks: "Detailed scope for the Rel. 12 SON study item" 3GPP TSG-RAN WG3 Meeting #79 Malta, Jan. 28-Feb. 1, 2013; R3-130074; 4 pages.
Ericsson "X2 Setup Procedure", 3GPP TSG RAN WG3 Meeting #58, Jeju Island, South Korea, Nov. 5-9, 2007, R3-072163, 2 Pages.
ETSI TS 136 300 V11.4.0 (Feb. 2013), LTE; Evolved Universal Terrestrial Radio Access (E-UTRA) and Evolved Universal Terrestrial Radio Access Network (E-UTRAN); Overall description; Stage 2 (3GPP TS 36.300 version 11.4.0 Release 11), 221 Pages.
Huawei "Impact of coverage change on SON", 3GPP TSG-RAN WG3 Meeting #79bis, R3-130608, Chicago, USA, Apr. 15-19, 2013, retrieved from the Internet at URL http://www.3gpp.org/ftp/tsg_ran/WG3_lu/TSGR3_79bis/Docs/.
International Preliminary Report on Patentability Corresponding to International Application No. PCT/SE2014/050359; Date of Mailing: Jun. 16, 2015; 8 Pages.
International Search Report and Written Opinion Corresponding to International Application No. PCT/SE2014/050989; Date of Mailing: May 12, 2015; 10 Pages.
International Search Report and Written Opinion Corresponding to International Application No. PCT/SE2014050359; Date of Mailing: Jul. 22, 2014; 11 Pages.
Response to Written Opinion Corresponding to International Application No. PCT/SE2014/050359; Dated: May 25, 2015; 4 Pages.
Samsung, "Discussion on the indication of AAS reconfiguration", 3GPP TSG RAN WG3 #87, Athens, Greece, Feb. 9-13, 2015, R3-150124; 3 Pages.
U.S. Appl. No. 61/808,997, Centonza A. et al. "Son Mechanisms for Active Antenna Systems Operations", Filing Date: Apr. 5, 2013; 22 Pages.
Written Opinion of The International Preliminary Examining Authority; Date of Mailing: Mar. 25, 2015; 7 Pages.
CATT, "Notification before AAS Action", 3GPP TSG RAN WG3 Meeting #87, R3-150224, Athens, Greece, Feb. 9-13, 2015, 3 Pages.
International Search Report and Written Opinion Corresponding to International Application No. PCT/SE2014/050990; Date of Mailing: Jun. 19, 2015; 11 Pages.
Laselva et al. "Self-Optimisation" In: "LTE Self-Organising Networks (SON)", John Wiley & Sons, Ltd. Chichester, UK, Dec. 9, 2011, pp. 135-234.
Nokia Siemens Networks, "Proposal for a Study Item on next-generation SON for UTRA and LTE", 3GPP TSG RAN Meeting #58, RP-122037, Barcelona, Spain, Dec. 4-7, 2012, 5 Pages.

* cited by examiner

Figure 8A

| IE/Group Name | Presence | Range | IE type and reference | Semantics description | Criticality | Assigned Criticality |
|---|---|---|---|---|---|---|
| >Cell Radiation pattern Information Item | | 1.. <maxCellineNB > | | | EACH | ignore |
| >>Cell ID | | | ECGI | Id of the cell indicating the radiation pattern | — | — |
| >>Cause | | | | Indicates the cause of the change of cell configuration | | |
| >>>Radiation pattern Type | | | ENUMERATED (Cell border, data channels, ...) | Indicates the type of radiation pattern provided | | |
| >>>DL Transmission Power Item | | 1.. <maxTransmissionPowerValues> | | | — | — |
| >>>>Transmission Power | | | INTEGER (-10..60, ...) | Transmission power in dBm | | |

Figure 8B

| IE/Group Name | Presence | Range | IE type and reference | Semantics description | Criticality | Assigned Criticality |
|---|---|---|---|---|---|---|
| >>>>Azimuth Angle | | | INTEGER (0..360 ..) | Transmission azumith angle | | |
| >>>>Elevation Angle | | | INTEGER (0..360, ..) | Transmission elevation angle | | |
| >>>>PRB Index | Condition al – if Radiation pattern Type is set to "data channels" | | BIT STRING (SIZE(12 0,...)) | Each position in the bitmap represents a DL resource block, for which value "1" indicates that the radiation pattern applies to the resource block and value "0" indicates that the radiation pattern does not apply to the resource block | | |

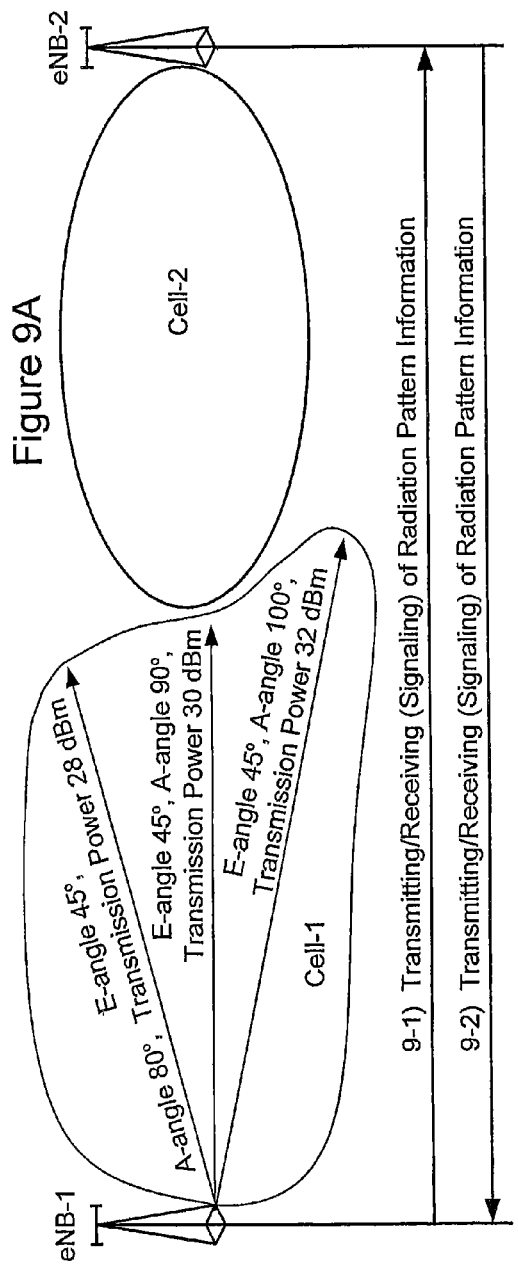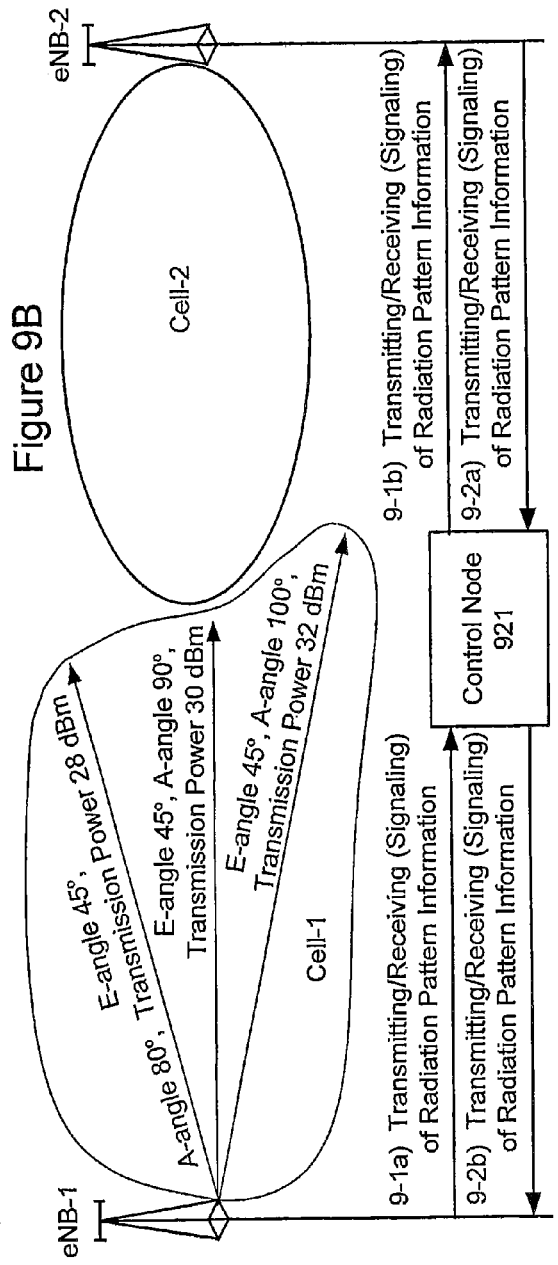

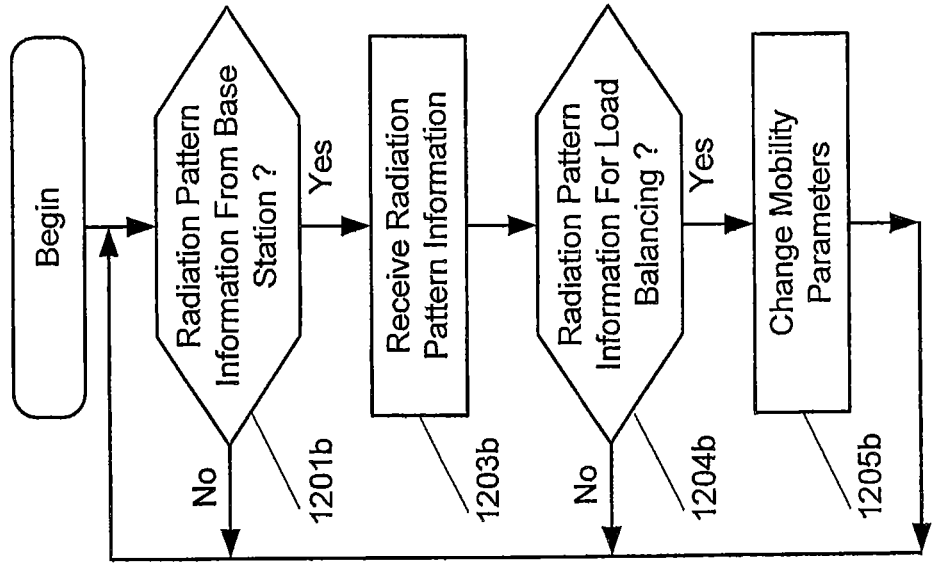
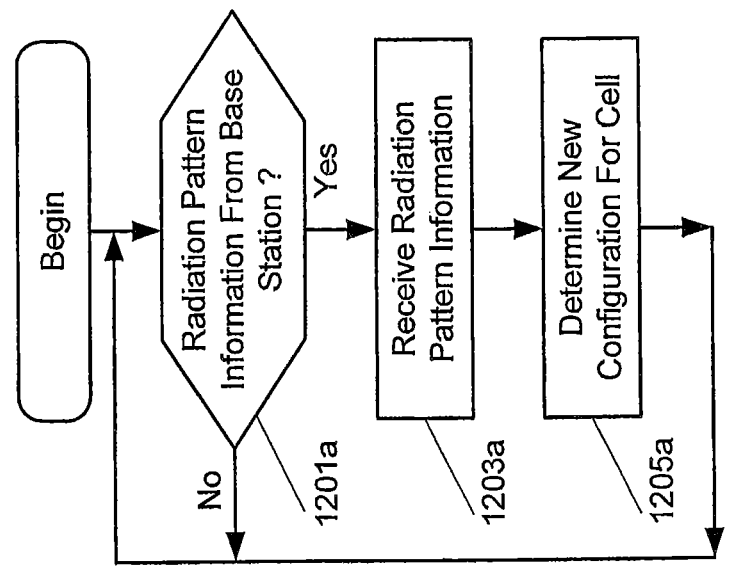

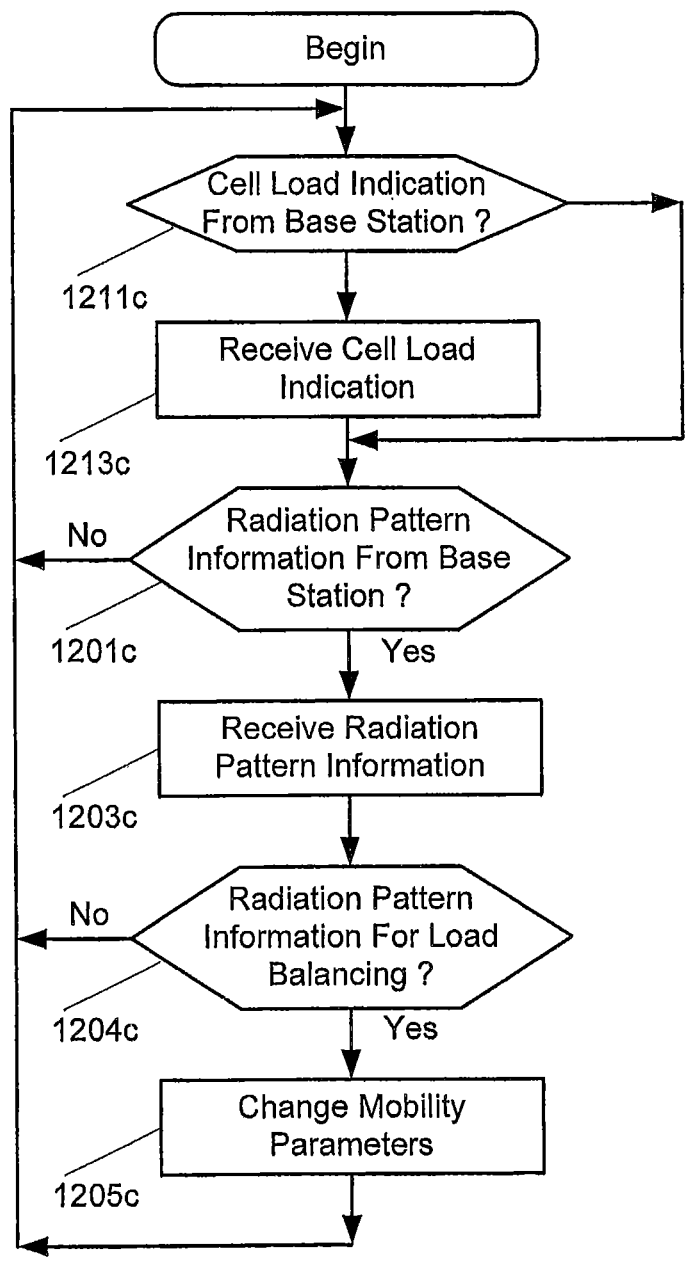

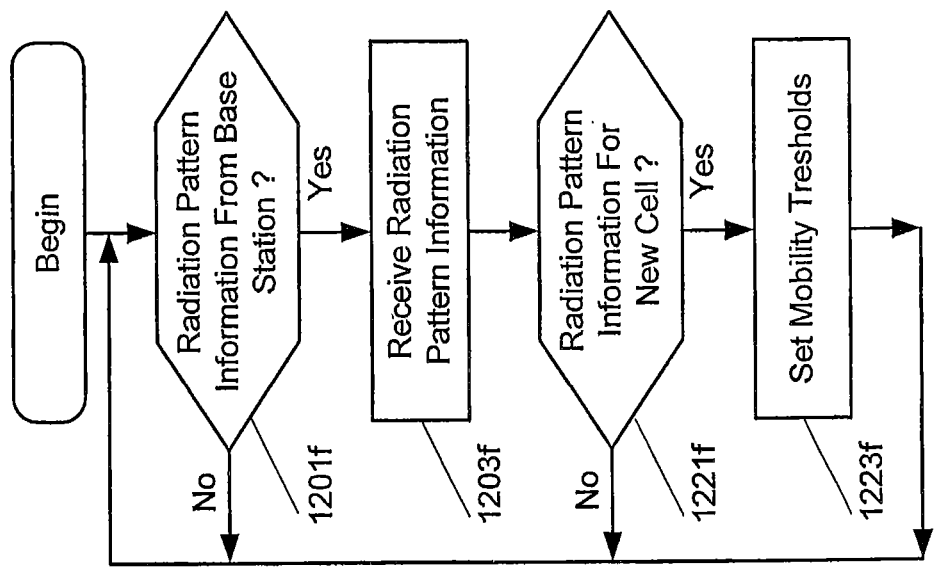

METHODS RECEIVING RADIATION PATTERN INFORMATION AND RELATED NETWORK NODES AND BASE STATIONS

CROSS REFERENCE TO RELATED APPLICATION

This application is a 35 U.S.C. §371 national stage application of PCT International Application No. PCT/SE2014/050990, filed in the English language on 28 Aug. 2014, the disclosure and content of which is incorporated by reference herein in its entirety.

TECHNICAL FIELD

The present disclosure relates communications, and more particularly, to methods of operating nodes in radio access networks and related network nodes and base stations.

BACKGROUND

During the course of standardization up to Release 11, a number of features were standardized to autonomously improve/optimize mobility, including load balancing, coverage, and capacity. Some of these features include Mobility Robustness Optimization (MRO) and Mobility Load Balancing (MLB).

In the course of Release 12, a new Study Item was started. As described in RP-122027, active antennas may allow the creation of multiple vertical and horizontal beams making deployment dynamic thereby enabling dynamic cell splitting/merging to handle changing load conditions. For example, beams may be steered to distribute capacity precisely according to actual traffic mix, traffic location, and/or user demands. Active antennas may thus be particularly useful for suburban and rural areas, where fixed deployment of pico cells is expensive, but the network may face congestion situations nonetheless. SON can automate the network deployment using active antennas. These scenarios may open up discussions on how to design new solutions that would enable a Self Optimized Network (SON) to automatically adjust to the changes introduced by Active Antenna Systems (AAS).

LTE

FIG. 1 illustrates a Long Term Evolution (LTE) architecture according to the Third Generation Partnership Project (3GPP) including logical interfaces (X2 interfaces) between base stations (also referred to as evolved nodeBs or eNBs) 101a, 101b, and 101c and logical interfaces (S1 interfaces) between each eNB and a respective packet core node (also referred to as a Mobility Management Entity Serving Gateway or MME/S-GW) 103a/103b. As shown, S1 interfaces may connect eNBs to MME/S-GWs, while X2 interfaces may connect peer eNBs.

An Evolved Universal Terrestrial Radio Access Network (E-UTRAN) includes a plurality of eNB nodes, which are connected to each other via an X2 interface(s). The S1 and the X2 interfaces can be divided into control plane (dashed lines) and user plane (solid lines) parts. While E-UTRAN is discussed by way of example, embodiments disclosed herein may be applied in other networks/standards (e.g., GSM, UTRAN, etc.). E-UTRAN is discussed herein merely by way of example.

Network Management

An example of a management system is shown in FIG. 2. The node elements or NEs (also referred to as base stations, eNodeBs, eNBs, etc.) are managed by a domain manager or DM (also referred to as the Operation and Support System or OSS). A DM is sometimes seen as comprising an element manager (EM), and/or sometimes, the EM is considered to be embedded in an NE. A DM may further be managed by a network manager (NM). An interface between two NEs may be provided using an X2 interface, whereas an interface between two DMs is referred to as an Itf-P2P interface. The management system may configure the network elements NEs, as well as receive observations associated with features in the network elements. For example, a domain manager DM may observe and configure network elements NEs, while a network manager NM observes and configures domain managers DMs. A network manager NM may also observe and configure network elements NEs via domain manager(s). According to embodiments disclosed herein, any function that automatically optimizes/improves NE parameters can in principle execute in the NE(s), DM(s), and/or the NM(s). Using configuration via a domain manager(s) DM(s), network manager(s) NM(s), and/or related interfaces, functions over the X2 and/or S1 interfaces may be coordinated throughout the radio access network (RAN), eventually involving the core network (i.e., the MME/S-GW).

Handover in LTE

FIGS. 3A and 3B illustrate X2 Handover in LTE in accordance with 3GPP TS 36.300, version 11.4.0, entitled "E-UTRAN overall description."

Handover is a significant aspect of any mobile communication system where the system tries to provide service continuity of wireless terminals (also referred to as User Equipment nodes, user equipment, UE, etc.) by transferring the connection of a UE from one cell to another depending on factors such as relative signal strengths, load conditions, service requirements, etc. The provision of efficient/effective handovers (reduced/minimum number of unnecessary handovers, reducedminimum number of handover failures, reduced/minimum handover delay, etc.), may affect not only the Quality of Service (QoS) of the end user but also overall mobile network capacity and/or performance.

In LTE (Long-Term Evolution), UE-assisted, network controlled handover may be used. In such systems, the network configures the UE to send measurement reports, and based on these reports, the UE is moved (if useful/required and if possible) to an appropriate cell that will provide service continuity and/or quality. Handover may be performed via an X2 connection, whenever available, and if not, using an S1 connection (i.e., involving the Core Network or CN). The X2 Handover process is shown in FIGS. 3A and 3B. The handover procedure can be sub-divided into three stages of preparation (initiation), execution, and completion.

Based on measurement results the source eNB receives from the UE during the preparation stage (e.g., using measurement control signaling 3-1 and measurement reports 3-2), the source eNB decides whether to handover the connection to another eNB (referred to as a target eNB) or not (e.g., HandOver Decision 3-3). If the decision is made to handover, the source eNB sends a HANDOVER REQUEST message 3-4 to the target eNB.

If the target eNB is able to admit the UE (e.g., Admission Control 3-5 and HandOver Request ACK 3-6), a message is sent to the UE (RRC Connection Reconfiguration Mobility Control Information 3-7) to initiate the handover, and the handover execution stage is entered. Downlink (DL) data arriving at the source eNB for the UE is then forwarded to the new target eNB.

The handover completion stage is entered once the target eNB and the UE are synchronized (SN Status Transfer 3-1, Synchronization 3-9, and/or UL Allocation and TA 3-10) and a handover confirm message (RRC Connection Reconfiguration Complete 3-11) is received by the target eNB. After a proper setup of the connection with the target eNB is performed (including Path Switch Request 3-12, Modify Bearer Request 3-13, and switching of the DL path 3-14 in the serving gateway), the old connection is released (Modify Bearer Response 3-15, Path Switch Request 3-16, UE Context Release 3-17, and Release Resources 3-18) and any remaining data in the source eNB that is destined for the UE is forwarded to the target eNB. Then normal packet flow can ensue through the target eNB.

Handover Measurement Triggering

A UE measurement report configuration includes the reporting criteria (whether it is periodic or event triggered) as well as the measurement information that the UE has to report. The following event-triggered criteria are specified for intra-RAT (intra Radio Access Technology) measurement reporting in LTE:

Event A1, Serving cell becomes better than absolute threshold;

Event A2, Serving cell becomes worse than absolute threshold;

Event A3, Neighbor cell becomes better than an offset relative to the serving cell;

Event A4, Neighbor cell becomes better than absolute threshold; and

Event A5, Serving cell becomes worse than one absolute threshold and neighbor cell becomes better than another absolute threshold.

Issues Related to Handover

As the brief description relating to Handover Measurement Triggering indicates, handover in LTE (Long Term Evolution) is controlled via several parameters. Incorrect parameter settings can lead to problems such as Radio Link Failure (RLF), Handover Failure (HOF), and/or Ping-pong Handover (also known as Handover Oscillation).

Radio Link Failure

If the handover parameters are set in such a way that the UE does not report handover measurements on time, the UE may lose the connection with the original cell before handover is initiated. As described in 3GPP TS 36.331 version 11.2.0, entitled "Radio Resource Control," when the UE receives a certain number of (N310) consecutive "out of sync" indications from the lower layer, the UE assumes a physical layer problem is ensuing, and a timer (T310) is started. If the UE doesn't receive a certain number of (N311) consecutive "in sync" indications from the lower layer before timer T310 expires, RLF is detected. RLF is also detected when a random access problem is indicated from MAC or upon indication that the maximum number of RLC retransmissions has been reached.

Handover Failure

Handover Failure (HOF) occurs if the connection with the original cell is lost while HO is ongoing with the target. When the UE receives a HO command (i.e. RRCConnectionReconfigurationRequest with mobilityControlInfo, as shown in FIGS. 3A and 3B), it starts a timer (T304), and if this timer expires before the HO is completed (i.e. RRCConnectionReconfigurationComplete message is sent by the UE), a HOF is detected.

Ping-Pong Handover/Handover Oscillation

Improper setting of handover parameters can make the UE handover back and forth between two neighboring cells. An example of this is a setting that makes the triggering conditions for the handover events (e.g., A3) valid between the source and neighbor cells at the same time. FIG. 4 illustrates ping-pong handover (also referred to as handover oscillation). A UE is said to have experienced handover oscillation if it stays in a target cell ($Cell_B$) for duration (T) that is less than the handover oscillation threshold ($T_{OSC}$), before it is handed back to the source cell ($Cell_A$). The oscillation rate can be defined as a ratio between the number of oscillations and the total number of HOs (HandOvers).

There is an upper boundary for an acceptable oscillation rate originating, for example, from core network load. Also the oscillation rate is related to end-user performance. On one hand, oscillation may be harmful because it may induce additional signaling and/or delays, and on the other hand, oscillations may allow the user to be connected to the best cell. This should be balanced for the end-user to experience a desired level of performance.

RRC Connection Reestablishment

When a RLF or HOF is detected by the UE, the UE starts a timer (T311) and tries to re-establish the connection to the best available cell (e.g., the source cell, another cell belonging to the same source eNB or a neighbor cell belonging to another eNB). This is known as RRC (Radio Resource Control) Connection Reestablishment, and is shown in FIG. 5. The UE transmits an RRCConnectionReestablishmentRequest 5-1 to the EUTRAN node, the EUTRAN node transmits an RRCConnectionReestablishment message 5-2 to the UE, and the UE transmits an RRCConnectionReestablishmentComplete message 5-3. The UE includes the following information in the re-establishment request: Physical Cell ID (PCI) of the last cell the UE was connected to before RLF; UE Identity including the C-RNTI (Cell Radio-Network Temporary Identifier) as well as MAC ID (Medium Access Control Identifier) for context lookup, using which the last serving cell can identify the UE; and Re-establishment cause (e.g., whether the request is due to handover failure, reconfiguration failure, or other causes).

If the UE context is found in the cell (if it is the source cell or if it was a cell prepared for handover, i.e., handover was ongoing when the RLF happened and the cell where the UE re-appeared already has the UE context, which was communicated to it from the source cell during Handover Request message exchange), the connection is re-established. Otherwise (if UE context is not available, or re-establishment did not succeed before T311 expires), the UE goes to IDLE mode and tears down all the active bearers, if any, and may restart the bearer setups if needed.

Mobility Robustness Optimization (MRO)

Configuring all the HO parameters manually to reduce/avoid occurrence of the aforementioned problems may be too expensive and can be challenging. As such, Mobility Robustness Optimization (MRO) has been introduced in 3GPP to automate the dynamic configuration of handover parameters. Briefly, MRO tries to identify the following three situations (too late HO, too early HO, HO to wrong cell), and based on the statistical occurrence of these situations, MRO tries to adjust the HO parameters.

Too Late HO occurs when a UE is handed over late to the target cell, so that the link to the source cell breaks before completing the handover.

Too Early HO occurs when a UE is handed over to a candidate cell too early resulting in a radio link or handover failure in the target cell. The UE returns soon to the source cell via re-establishment procedures.

Handover to wrong cell occurs when a UE is handed over to one target cell but it experiences a RLF within a short duration after that in the target cell and the UE re-establishes the connection at another cell. A proper parameter setting would most probably have led to the handing over of the UE to the last target cell to begin with.

MRO tries to gather statistics on the occurrence of Too Late HOs, Too Early HOs, and HO to the wrong cell, and these statistics can be used to adjust the handover parameters. One or more of the following handover parameters controlling the event driven reporting of the UE can be adjusted using MRO: Threshold indicating how much stronger a certain candidate cell needs to be before it is reported to the serving cell; Filter coefficient(s) applied to the measurement before evaluation triggers are considered; and/or Time to trigger meaning the time window within which the triggering condition needs to be continuously met in order to trigger the reporting event in the UE. For example, a higher 'too early handover' ratio than desired can be counter-acted by increasing the threshold, thereby delaying the triggering of A3 event. Another example could be the resolving of a higher 'handover to wrong cell' ratio than desired by increasing the threshold towards the first, unwanted, target cell.

Three main message types (i.e., RLF reports between the UE and eNBs, RLF INDICATION reports between eNBs, and HANDOVER REPORTs between eNBs) are used by MRO to communicate/gather information regarding Too Early Handover, Too Late Handover, and Handover to the wrong cell. HandOver HO failures are discussed, for example, in Section 22.4.2 of TS 36.300, V.11.4.0 (2012-12), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), pages 1-208. Moreover, the disclosure of TS 36.300, V.11.4.0 is hereby incorporated herein in its entirety by reference.

Mobility Load Balancing

As specified in 3GPP TS 36.300 version 11.4.0, entitled "E-UTRAN overall description," the objective of load balancing is to distribute cell load evenly among cells and/or to transfer part of the traffic from congested cells. This may be performed using self-optimization of mobility parameters and/or handover actions.

Self-optimization/improvement of the intra-LTE and inter-RAT mobility parameters to the current load in the cell and in the adjacent cells can improve system capacity compared to static/non-optimized cell reselection/handover parameters. Such optimization/improvement can also reduce/minimize human intervention in the network management and optimization/improvement tasks. As shown in FIG. 6, support for mobility load balancing within a radio access network RAN using load balancing algorithm 601 may include one or more of following functions:

Load reporting 603;

Load balancing 605 action based on handovers; and/or

Adapting handover 607 and/or reselection configuration. Triggering of each of these functions is optional and may depend on implementation. A functional architecture of SON (Self Optimized Network) load balancing is presented in FIG. 6.

The Mobility Settings Change is a procedure used to induce load balancing via mobility and/or to report and suggest changes of the parameters used to trigger mobility between two nodes. A mobility setting change procedure is illustrated in FIG. 7 where an X2-AP Mobility Change Request is transmitted 7-1 from eNB-1 to eNB-2, an X2-AP Mobility Change Acknowledge is transmitted 7-2 from eNB-2 to eNB-1, and an X2-AP Mobility Change Failure is transmitted 7-3 from eNB-2 to eNB-1.

Active or Adaptive or Reconfigurable Antenna Systems

Antenna systems in mobile communications may be based on a combination of one or more antenna elements. The antenna elements of the system can be combined in different ways (e.g., using different amplitudes, delays/phases, frequencies, etc.) to focus the antenna transmission and reception with directivity. The antenna system can transmit and receive more energy in some directions than in others. By reconfiguring/adapting the combination of antenna elements, the antenna system can be adapted to change directivity over time. This means that it is possible to change the cell shape from one cell shape to another at a specific time, where cell shape reflects the area in which the cell associated with the antenna system is providing services. An antenna system, for example, can include an array of antenna elements supporting transmission to and reception from a cell (also referred to as a sector), and a base station may include three such antenna systems supporting communications over three 120 degree cells/sectors. A cell is further associated with a radio access technology and a frequency carrier for downlink communication and a frequency carrier for uplink communication. The uplink and downlink frequency carriers can be different as in frequency division duplex (FDD) or the same as in time division duplex (TDD). The antenna system can provide service to multiple cells covering a similar sector area. In other nomenclatures, this could also be considered as different antenna systems, with a one to one mapping between the cell and the antenna system. Even though one antenna system is associated with multiple cells covering a similar sector area, it can still be configured differently for different cells, also possibly differently for uplink and downlink operations.

In some current base stations, a single radio transceiver drives a group of antenna elements. The signal from the transceiver to each element is delayed by a differing amount, such that the phase of the signal transmitted at each antenna elements differs. The phase difference impacts the direction of radiation of the antenna. Typically, the transceiver may be located some distance from the antenna elements, with connection therebetween provided via a cable. In so-called MIMO systems, there may be several transceivers, but the transceivers may not be integrated with the antennas.

Passive antenna systems may be reconfigurable, for example, using a Remote Electrical Tilt, so that phase delay paths between transceiver and elements are physically adjusted.

In an active antenna system, the transceivers and antennas may be in general be integrated to some extent. Furthermore, instead of one transceiver driving all elements, several transmitters may drive one or more elements in groups. Unlike MIMO systems, the transceiver to element mapping may allow dynamic adjustment of beams transmitting the same reference symbols.

The term Active Antenna System may refer to base stations that integrate radio and antenna elements, or that have multiple transceivers mapped to different elements but transmitting the same Cell specific Reference Signal (CRS), or both.

By reconfiguring/adapting amplitude and phase of AAS transceivers, the antenna system can be adapted to change directivity over time. This means that it is possible to change the cell shape from one cell shape to another at a specific time. Accordingly, it may be possible to change the cell shape from one cell shape to another cell shape at a specific time, where cell shape reflects the area in which the cell associated with the antenna system is providing services.

In general, an antenna system can be used to realize/provide/service one or more cells, and AAS beamforming operation also can include splitting and merging of cells. AAS operation can be managed by the associated base station, or by a different network or management node. For example, one antenna system for a 120 degree cell/sector may be configured to adaptively split the cell/sector (having one cell/sector identification) into two or more smaller cells/sectors (each having respective different identifications), to merge two smaller cells/sectors into one larger cell/sector, to change a shape/size/range of the cell(s)/sector (s), etc. AAS is sometimes denoted adaptive antenna systems or reconfigurable antenna systems (RAS) or antenna arrays or group antennas. As used herein, the term adaptive antenna system denotes any antenna system (including an Active Antenna System or AAS) that can be reconfigured/adapted while in operation as well as when not in operation.

Procedures to optimize/improve mobility robustness, load balancing, coverage, and/or capacity have generally been designed on the basis of semi-static deployment scenarios. Namely, scenarios considered may not change dynamically, but rather may be stable until the optimization function decides to apply a corrective measure, for example, to change mobility parameters and/or cell coverage.

With the adoption of dynamic AAS based solutions it may be possible that the cell deployment topology changes in a dynamic manner. Such dynamic changes at one cell introduced by AAS (e.g., cell splitting, cell merging, cell expansion/contraction, etc.), however, may be incompatible with current SON applications.

SUMMARY

According to some embodiments of inventive concepts, methods may be provided to operate a first node in a radio access network (RAN) including a plurality of base stations. For example, radiation pattern information for a radio access network transmission may be received from a second node. Moreover, the radiation pattern information may include an indication of power and an indication of direction associated with the indication of power for the radio access network transmission.

The receiving node may thus adapt its operation (if the receiving node is a base station) or the operation of another node (if the receiving node is a control node) to improve network performance and/or efficiency based on the radiation pattern information (including indications of power and direction). For example, the radiation pattern information may be used by a receiving base station to adjust mobility parameters between cells, to reduce interference between cells, and/or to increase capacity and/or coverage.

By receiving the radiation pattern information for a radio access network transmission (including indications of power and direction), the receiving node may adapt its operation (if the receiving node is a base station) or the operation of another node (if the receiving node is a control node) to improve network performance and/or efficiency. For example, the radiation pattern information may be used by a receiving base station to adjust mobility parameters between cells, to reduce interference between cells, and/or to increase capacity and/or coverage.

Responsive to receiving the radiation pattern information, a new configuration may be determined for a cell neighboring a base station associated with the radiation pattern information. Determining the new configuration may include determining a configuration of a common channel of the cell neighboring the base station based on the radiation pattern information for the radio access network transmission from the base station. Determining the configuration of the common channel may include reducing a power of the common channel in at least one direction responsive to the to the radiation pattern information indicating an increase in power of the radio access network transmission from the base station, and/or increasing a power of the common channel in at least one direction responsive to the to the radiation pattern information indicating a decrease in power of the radio access network transmission from the base station. The second node may be the base station associated with the radiation pattern information.

Responsive to determining that the radiation pattern information was transmitted for purposes of load balancing, mobility parameters for a cell neighboring a node associated with the radiation pattern information may be changed. Changing mobility parameters may include triggering handovers from the cell neighboring the node associated with the radiation pattern information to the node associated with the radiation pattern information responsive to an increase in coverage area of the node associated with the radiation pattern information, and/or accepting handovers from the node associated with the radiation pattern information at the cell neighboring the node associated with the radiation pattern information responsive to a decrease in coverage area of the node associated with the radiation pattern information. The second node may be the node (i.e., a base station) associated with the radiation pattern information. The radiation pattern information may include a cause indication to indicate a reason for transmission of the radiation pattern information, and the cause indication may be used to determine that the radiation pattern information was transmitted for purposes of load balancing. Moreover, a cell load indication may be received indicating a load of a node associated with the radiation pattern information, and the cell load indication may be used to determine that the radiation pattern information was transmitted for purposes of load balancing.

Responsive to the radiation pattern information being for a new cell supported by the node associated with the radiation pattern information, mobility thresholds may be set for a cell neighboring the node associated with the radiation pattern information.

Responsive to the radiation pattern information being for data channel resource utilization, data channel resource utilization may be coordinated for a cell neighboring a node associated with the radiation pattern information.

A subframe configuration in time division duplex (TDD) may be modified for a cell neighboring a node associated with the radiation pattern information. In addition, an indication of the subframe configuration in time division duplex may be transmitted to the second node. Modifying the subframe may include allocating conflicting resources to uplink transmissions along the direction for the radio access network transmission.

The first node may be a first base station and the second node may be a second base station. Moreover, receiving the radiation pattern information may include receiving the radiation pattern information for the radio access network transmission from the second base station.

The first node may be a central control node, and receiving the radiation pattern information for the radio access network transmission may include receiving the radiation pattern information at the central control node.

The radiation pattern information may be defined for a time resource and/or a frequency resource for the radio access network transmission.

The radiation pattern information may be for a common channel transmitted in accordance with the radiation pattern information.

The radiation pattern information may be for a dedicated data and/or control channel transmitted in accordance with the radiation pattern information.

The indication of direction may include an indication of an azimuth angel relative to a reference direction.

The indication of direction may include an indication of elevation defining an angle of elevation relative to a reference elevation (e.g., the horizon).

The radiation pattern information may include time validity information to define a time during which the radiation pattern information is valid and/or to define a time after which the radiation pattern information is invalid.

The radiation pattern information for the radio access network transmission may include a plurality of indications of power and respective indications of direction.

According to some other embodiments, a first node may be provided in a radio access network (RAN) including a plurality of base stations. The first node may include a network interface, and a processor coupled to the network interface. The processor may be configured to receive radiation pattern information for a radio access network transmission, wherein the radiation pattern information is received from a second node though the network interface. The radiation pattern information may include an indication of power and an indication of direction associated with the indication of power for the radio access network transmission.

The first node may be a base station, and the first node may further include an antenna system comprising a plurality of antenna elements, and a transceiver coupled between the processor and the antenna system. In addition, the processor may be configured to received the radiation pattern information for the radio access network transmission from the second node through the network interface.

In an alternative, the first node may be a central control node.

BRIEF DESCRIPTION OF THE DRAWINGS

FIGS. 8A and 8B provide a table illustrating messaging for radiation pattern information according to some embodiments of inventive concepts;

FIGS. 9A and 9B are schematic diagrams illustrating signaling of radiation pattern information according to some embodiments of inventive concepts;

FIGS. 12A, 12B, 12C, 12D, 12E, and 12F are flow diagrams illustrating operations using radiation pattern information received from another network node according to some embodiments of inventive concepts.

DETAILED DESCRIPTION

Figure 1:
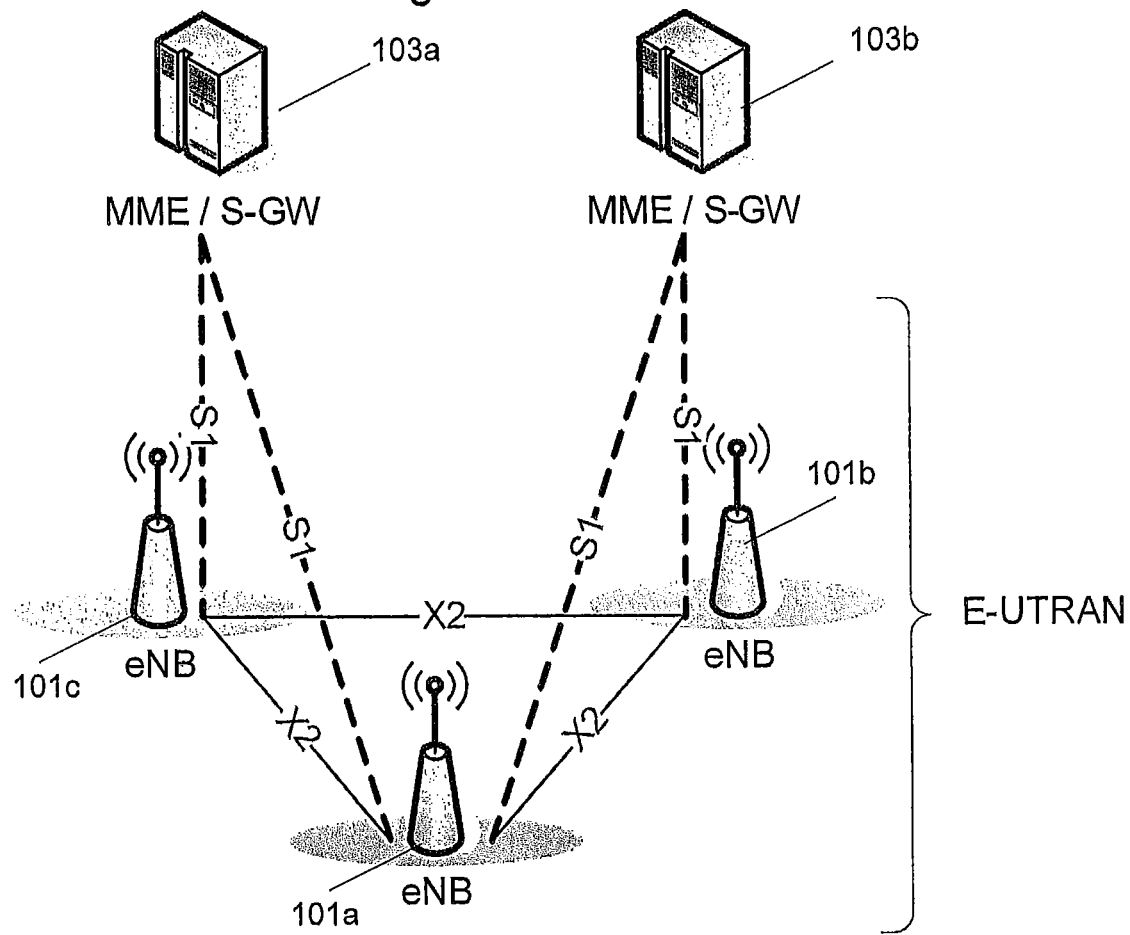
FIG. 1 is a schematic diagram illustrating elements of a radio access network according to an LTE architecture.
Figure 2:
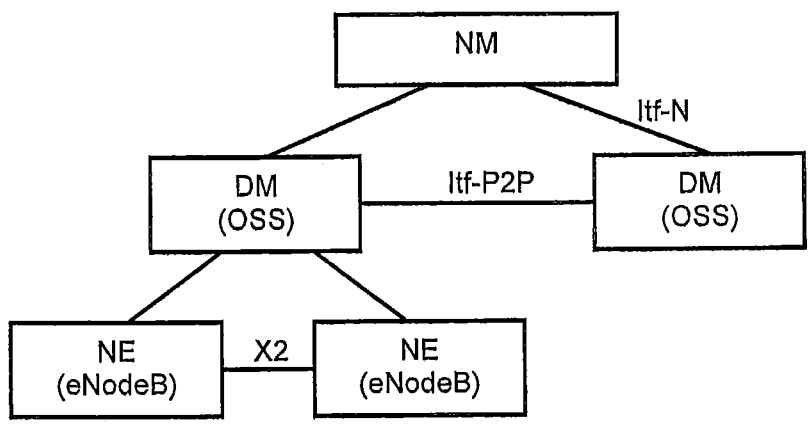
FIG. 2 is a block diagram illustrating a mobile communication management system.
Figure 3A:
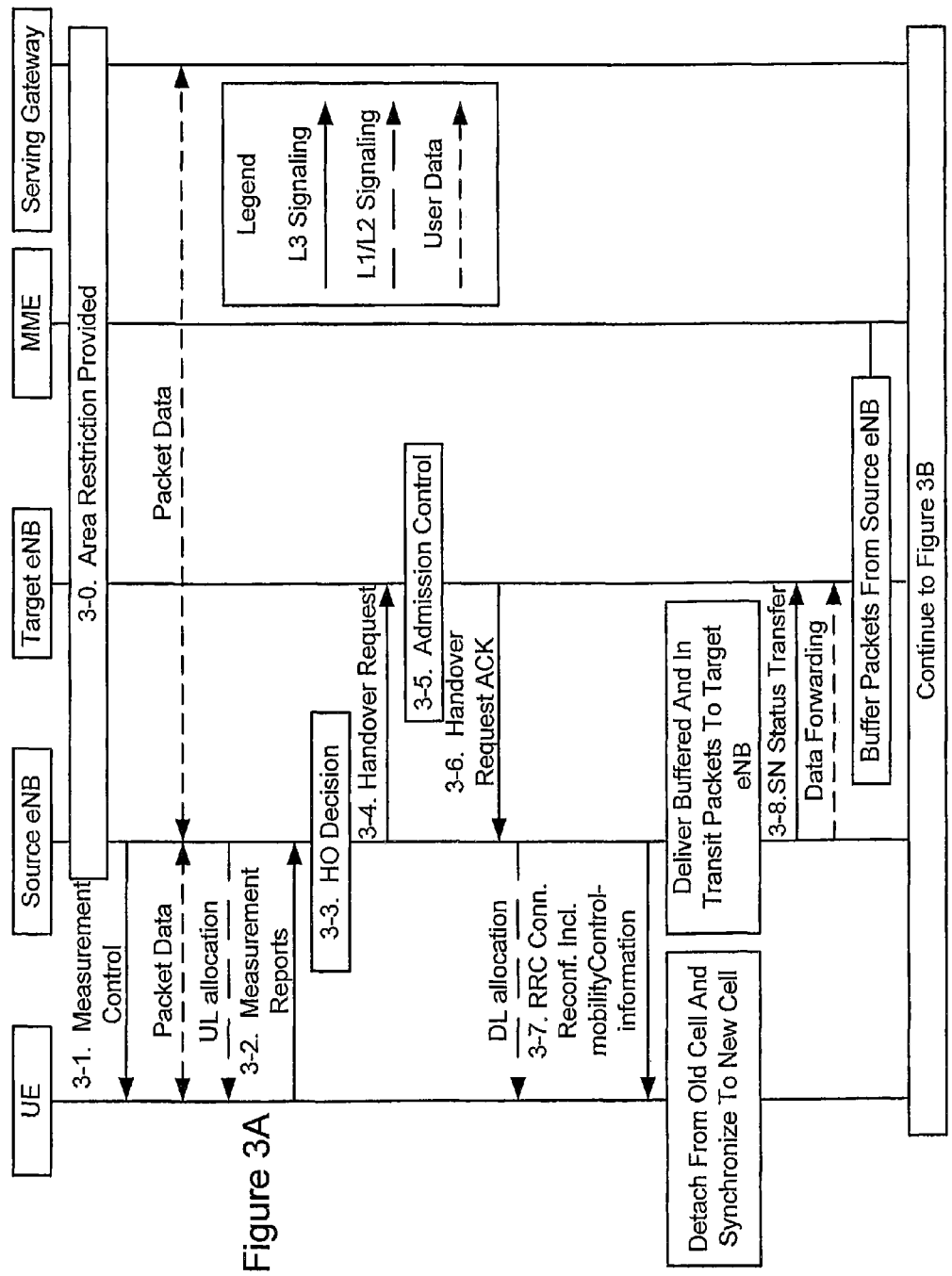
FIGS. 3A and 3B provide a message diagram illustrating handover operations according to an LTE architecture.
Figure 3B:
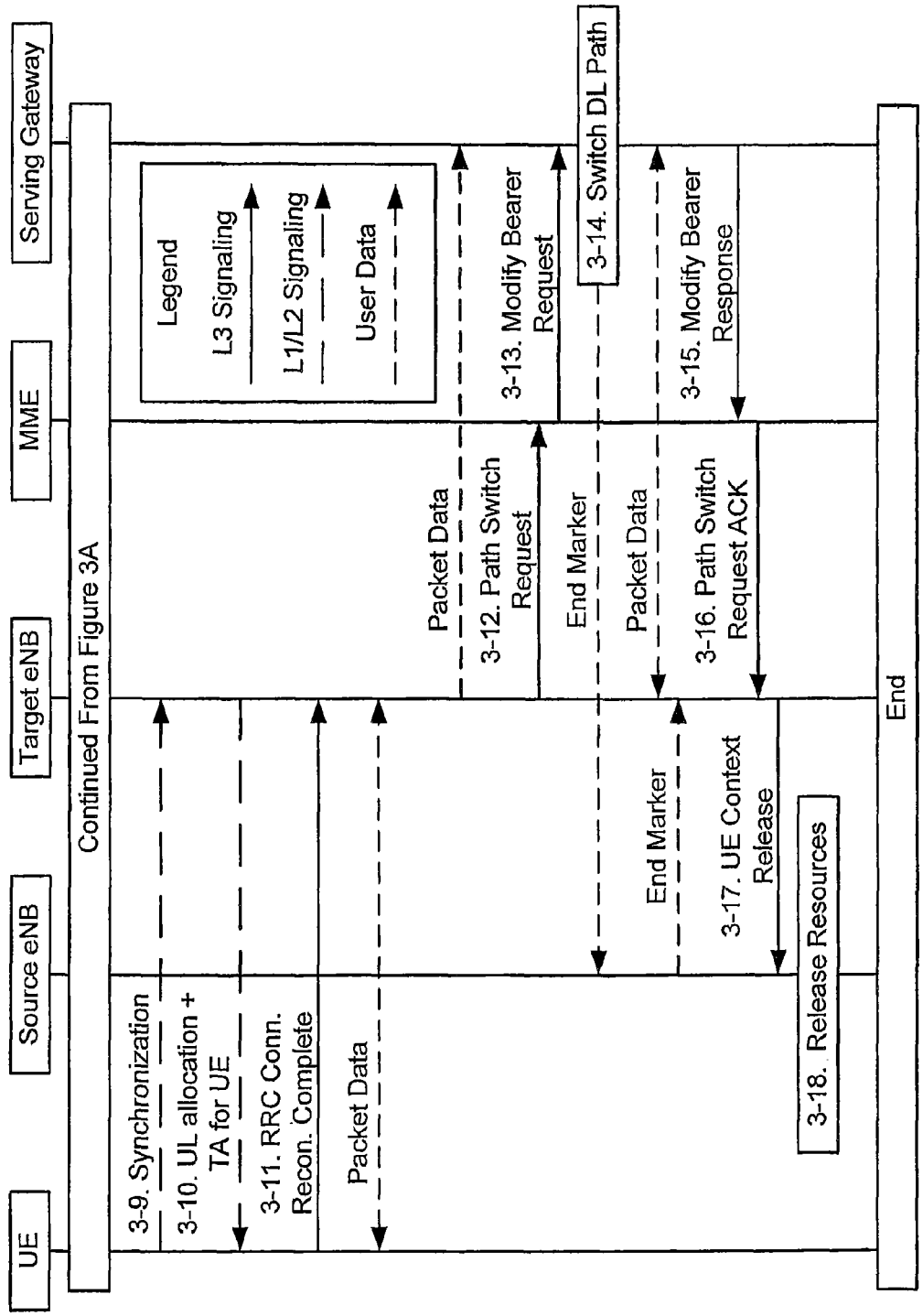
Figure 4:
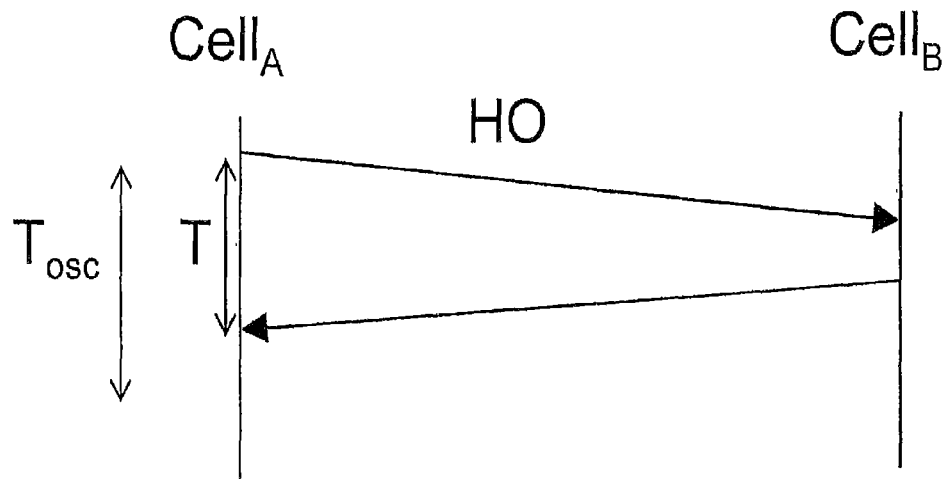
FIG. 4 is a message diagram illustrating ping-pong handover (also referred to as handover oscillation)
Figure 5:
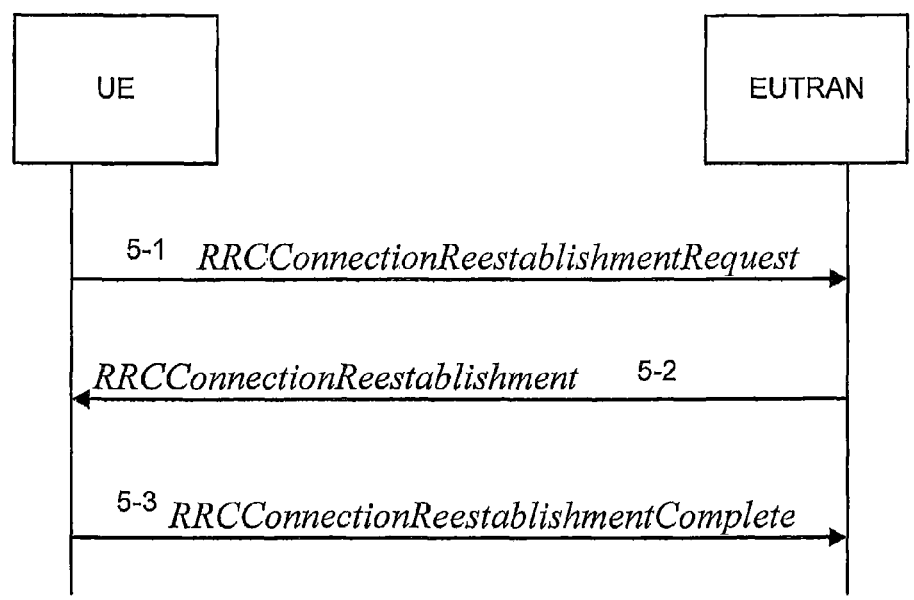
FIG. 5 is a message diagram illustrating operations of Radio Resource Control Connection Reestablishment.
Figure 6:
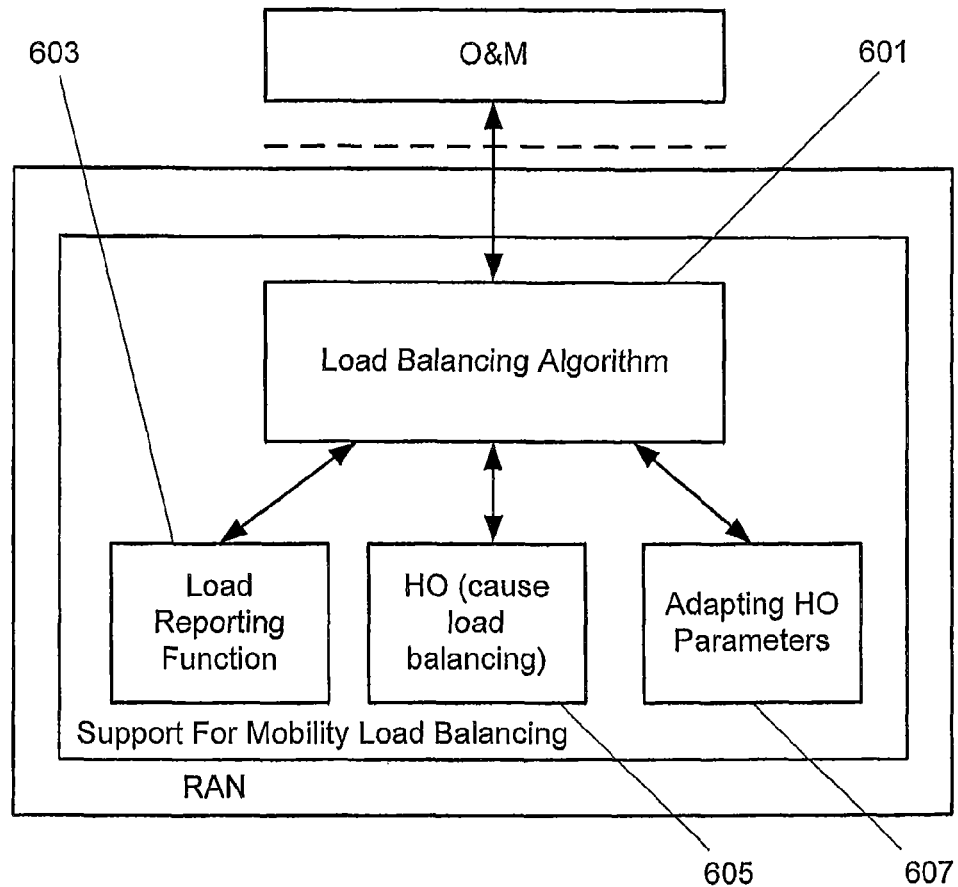
FIG. 6 is a block diagram illustrating an architecture of Self Optimized Network load balancing.
Figure 7:
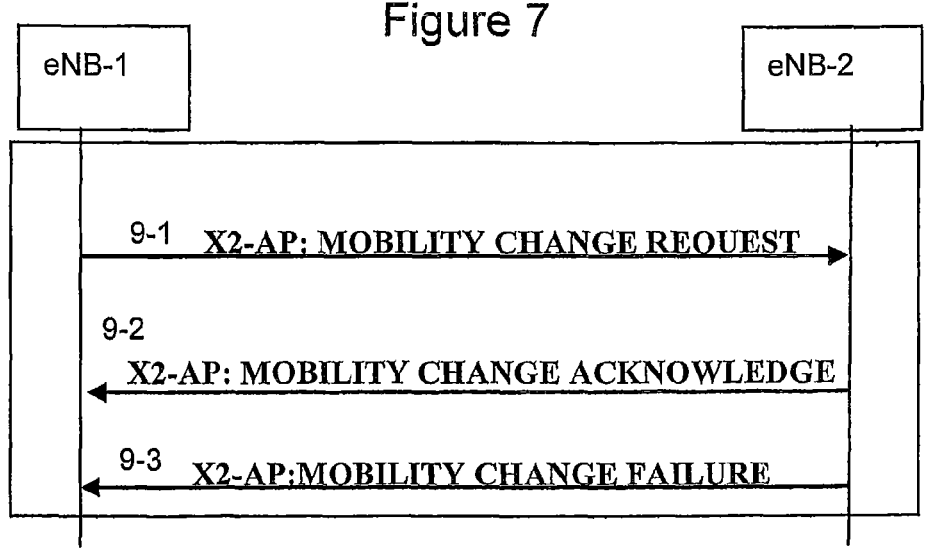
FIG. 7 is a message diagram illustrating mobility setting change procedures.

As discussed in 3GPP, within the course of the Next Generation SON Study and captured in 3GPP TR 37.822 V12.0.0 ("3rd Generation Partnership Project; Technical Specification Group Radio Access Network; Study on next generation Self-Optimizing Network (SON) for UTRAN and E-UTRAN," Release 12, 2014-06), it may be possible for an adaptive antenna system (e.g., an active antenna system or AAS) to apply certain levels of adjustments to cell configurations. For example, adjustments listed in TR37.822 may be in the form of per UE beamforming, cell shaping, and/or cell splitting/merging. The study revealed that it may be beneficial to notify a neighbor radio access network (RAN) node (e.g., an eNB) of a change due to adaptive antenna system adjustments. For example, an indication of cell splitting/merging and/or cell coverage change may be beneficial. The disclosure of 3GPP TR 37.822 V12.0.0 is hereby incorporated herein in its entirety by reference.

U.S. Application No. 61/808,997 (entitled "SON Mechanisms For Active Antenna Systems Operations" and filed Apr. 5, 2013) and International PCT Application No. PCT/SE2014/050359 (entitled "Methods Of Operating Radio Access Network Base Stations And Related Network Nodes," filed Mar. 25, 2014, and published as WO 2014/163553 discuss signaling an indication of changes of cell configuration between RAN nodes and use of indices to indicate respective cell configurations. The disclosures of U.S. Application No. 61/808,997 and International PCT Application No. PCT/SE2014/050359 are hereby incorporated herein in their entireties by reference.

Self-organizing mechanisms for coordination of active antenna systems (AAS) have not, however, addressed accurate exchange of information between RAN nodes concerning changes in radiation patterns of each cell. Without this information, it may not be feasible/possible to coordinate coverage footprints among neighboring cells.

As shown in FIG. 9A, node (e.g., base station) eNB-1 may support Cell-1, and node (e.g., base station) eNB-2 may support Cell-2, and by signaling an indication of a change in cell configuration (e.g., cell splitting/merging, cell shape change, etc.) of Cell-1 from node eNB-2 to eNB-2, receiving node eNB-2 may understand that the cell configuration at the source node eNB-1 has changed, and when pre-set cell configurations have been established, the receiving node eNB-2 may understand which of such configurations has been adopted. These mechanisms, however, may not effectively/efficiently cope with fully dynamic adjustments of cell configuration due to coverage and/or capacity improvement/optimization if the changes are limited to pre-established layouts.

According to some embodiments of inventive concepts disclosed herein, radiation pattern information may be exchanged between source node (e.g., source base station supporting Cell-1) eNB-2 and receiving node (e.g., receiving base station) eNB-2 that allows for a clearer understanding of the radiation pattern adopted by a given cell (e.g., adopted by Cell-1 supported by source base station eNB-1). According to additional embodiments of inventive concepts disclosed herein, receiving node eNB-2 may use such information to adopt mechanisms that enhance coverage and/or capacity improvement/optimization, system efficiency, and/or performance.

According to some embodiments of inventive concepts disclosed herein, signaling of radiation pattern information between RAN nodes eNB-1 and eNB-2 and/or between nodes able to have a role in coordination of radio access configuration/planning may provide detailed information of transmission power radiated per different channels in different geographical locations. As a consequence, this radiation pattern information may be used to convey/determine a geographical coverage map or radiation pattern of different channels per cell.

Throughout this disclosure, the terms radiation pattern, coverage map, and radiated power may be equivalently used to identify a configuration of power resource utilization in the time, frequency, and 3 dimensional space domain.

Methods disclosed herein may allow different nodes in a network to be informed about dynamic changes in radiation patterns of different channels.

The changes can be cell specific (e.g., when the change regards a reference signal or signals that determine a "cell edge") or UE specific (e.g., when the change regards a per UE data/control channel configuration).

Moreover, possible node behaviors may be specified once information from a neighboring node(s) has been received.

Such methods may also cover adaptation of receiving node eNB-2 responsive to receiving radiation pattern information from a different node (e.g., from source node eNB-1). With regard to cell specific radiation pattern information, for example, the received radiation pattern information may be used to adapt node coverage of Cell-2 of receiving node eNB-2 in a way to reduce/avoid radio link failures, handover failures, and/or ping pong handovers. The radiation pattern information can be used to perform improved/optimized mobility load balancing towards a cell that has locally expanded its coverage and that is able to receive more traffic load. If a coverage area of Cell-1 has expanded, for example, node eNB-2 may adapt mobility operations to hand off UE's at/near an edge of Cell-2 to Cell-1.

Similarly, with respect to UE specific radiation pattern information, methods disclosed herein may allow receiving node eNB-2 to coordinate resource utilization in a way to reduce cross cell interference.

According to some embodiments, exchange of detailed cell configuration information (e.g., radiation pattern information) may allow coverage, capacity, performance, and/or efficiency improvement/optimization.

According to some embodiments, efficient mobility between neighboring cells may be enabled by calculating and/or exchanging radiation patterns that match between cells in a neighborhood.

According to some embodiments, reduction/mitigation of interference may be enabled by allowing RAN nodes to understand how resources will be utilized by neighbor cells in time, frequency, and/or geographical location.

According to some embodiments illustrated in FIG. 9B, development of a centralized architecture may be enabled where the radiation pattern information is not directly signaled between peer nodes (e.g., between peer base stations eNB-1 and eNB-2) but is instead sent to a central control node 921 (also referred to as a coordinator node) that can harmonize cell configuration changes across a wide neighborhood of base stations and/or cells.

According to some embodiments, AAS beamshaping and/or cell splitting may be coordinated between nodes to further increase/maximize capacity and/or coverage.

According to some embodiments of inventive concepts, each RAN node (e.g., base stations eNB-1 and eNB-2) may be aware of geographical locations of neighboring RAN nodes (e.g., neighboring base stations). Accordingly, each RAN node may know, for example, the position of its neighboring RAN nodes either in absolute values (e.g., via absolute geographical coordinates, such as longitude and latitude) or in relative values (e.g., relative positions of each neighbor node in relation to itself). Such information can either be signaled between nodes, it can be configured in each RAN node, or it can be provided by a control node.

According to some embodiments, a RAN node (e.g., a base station) eNB-1 may signal/transmit to a neighbor RAN node (e.g., a neighbor base station) eNB-2 radiation pattern information indicating a radiated power and an associated transmission direction. The radiated power can be specified by radiation pattern information including indication(s) of a transmission power at an azimuth angle(s) and an elevation angle(s). This may provide a scalable and accurate way to communicate from source node eNB-1 to a receiving neighbor node eNB-2 any changes of cell configuration. Moreover, the granularity of such radiation pattern information can be increased or decreased by using a higher or lower resolution for azimuth and/or elevation angles. An example of how the radiation pattern information can be provided in tabular form is provided in the table of FIGS. 8A and 8B.

An example of encoding radiation pattern information is provided in the table of FIGS. 8A and 8B. This information can be provided as a list of information per cell served by the sending eNB. Information provided for each cell may include of a tuple of radiation pattern information including at least each of the following parameters:

1) Radiation Pattern Type: This IE (information element) represents the type of map provided. The values of this IE indicate whether the map applies to channels defining cell edge (e.g., reference channels, or data channels) in which case the map may also indicate power and transmission direction on a per Primary Resource Block (PRB) basis. As an enhancement of this information, specific channels can be also signaled together with the Radiation Pattern, for example, broadcast Channel (BCH), Primary Downlink Shared Channel (PDSCH), etc.

2) Transmission power: This IE provides an indication (either in absolute values or in delta values with respect to a previously sent or configured parameter) of the power emitted in the indicated horizontal angle and azimuth angle and for the channel and resources specified in other IEs.

3) Azimuth Angle: This IE provides an indication of the horizontal angle or Azimuth in which the power is radiated, with respect to a common reference direction such as the north axes.

4) Elevation Angle: This IE provides an indication of the elevation angle of transmission with respect to a common reference elevation such as the horizon.

5) PRB Index: The presence of this IE is conditional to the radiation patterns related to data channels. In the example of FIGS. 8A and 8B, this IE may be encoded in the form of a bit string up to the maximum number of Primary Resource Blocks (PRBs) supported in a cell. A value of "1" in the bit string means that the PRB corresponding to the bit number follows the emissions described in the radiation pattern.

It can be appreciated from the example in FIGS. 8A and 8B that the radiation pattern information can be signaled in a more or less detailed way by increasing or decreasing a granularity of information (e.g., the number of items in the list) in the DL Transmission Power Item List. For example, updates of radiation pattern signaling could be reduced/minimized by signaling first detailed radiation pattern information (which could also be configured, for example, via OAM in neighboring nodes as a starting radiation pattern of neighbor cells) and then signaling radiation pattern information only for updates of transmission powers/directions in a geographical area(s) of interest. Similarly, an amount of radiation pattern information signaled could be reduced/minimized by providing radiation pattern information with low granularity transmission directions (e.g., transmission power detailed every 10 degrees change of elevation angle and azimuth angle). Radiation pattern information may be transmitted, for example, responsive to changes in azimuth/elevation angle greater than a threshold amount (e.g., greater than 10 degrees). Relatively minor changes in azimuth/elevation angle (e.g., less than a threshold of 10 degrees) may not result in transmission of radiation pattern information from one node to another. Similarly, radiation pattern information may be transmitted, for example, responsive to changes in power greater than a threshold amount (e.g., greater than 10 dBm), and relatively minor changes in power (e.g., less than 10 dBm) may not result in transmission of radiation pattern information from one node to another.

FIG. 9A is a schematic diagram illustrating examples of radiation patterns and signaling messages used to transmit/receive associated radiation pattern information between source and receiving base stations eNB-1 and eNB-2. In FIG. 9A, radiation pattern information may define/describe a shape of a cell (e.g., Cell-1) serviced by source node eNB-1. The Cell-1 transmissions of FIG. 9A may refer to a cell edge radiation patterns, i.e., radiation patterns of reference signals in Cell-1. In the example of FIG. 9A, the arrows indicating transmission power in Cell-1 all refer to an elevation angle of 45 degrees below a horizontal reference plane (e.g., 45 degrees below the horizon). However, transmission power levels can be specified for many different azimuth angles. In the example of FIG. 9A, the information can be signaled directly between base stations eNB-1 and eNB-2 over an inter node interface. In an example of LTE and when such information is signaled between RAN base station nodes, the interface may, for example, be the X2 interface. Similarly, the information can be signaled (transmitted/received) 9-1a and/or 9-1b to/from a centralized control node 921 (such as an OAM node/system) as shown in FIG. 9B. In example of FIG. 9B, the interface used to signal radiation pattern information may be a RAN to OAM interface.

In the examples of either of FIGS. 9A and/or 9B, transmitting/receiving (signaling) of radiation pattern information (at 9-1, 9-1a, and/or 9-1b) may include transmitting radiation pattern information (including indications of power, azimuth angle, and/or elevation angle) for each of the three illustrated directions. For example, transmitting/receiving (at 9-1, 9-1a, and/or 9-1b) the radiation pattern information may include transmitting/receiving the radiation pattern information for all of the three illustrated directions in a single message (e.g., in a single X2AP message) including three indications of power, three indications of direction, and three indications of elevation, or transmitting/receiving separate messages (e.g., separate X2AP messages) for each of the three illustrated directions, with each message including a one indication of power, one indication of direction, and indication of elevation for a respective one of the directions.

In some embodiments of methods described above, radiation pattern information can be exchanged using an X2AP message which can be, for example, one of the following messages:
an X2AP Mobility Change Request/Acknowledge message;
an X2AP eNB Configuration Update Request/Acknowledge message;
an X2AP Setup Request/Response message;
a Resource Status Request/Response/Update message; or
an X2AP Load Information message.

If the radiation pattern information refers to common channel transmission power (e.g., including one or more of a Common Reference Signal CRS, Broadcast Channel BCH, Primary Downlink Common Channel PDCCH, Physical Control Format Indicator Channel PCFICH, Physical Hybrid ARQ Indicator Channel PHICH, etc.), the radiation pattern information may provide indication on the control channel coverage, which is connected to the cell edge shape. Therefore, when a cell shape change (e.g., for the purpose of coverage improvement/optimization, for example, to patch for a coverage shadow area, or capacity improvement/optimization, for example, to absorb more traffic offloaded from a neighbor cell or to offload traffic to a neighbor) is made, such radiation pattern information can be signaled to neighbor nodes (e.g., signaled from source base station eNB-1 to receiving base station eNB-2). In addition, this radiation pattern information can be signaled when a cell is newly created at the expense of other cells in the neighborhood, modifying their shapes. The latter could be the case of cell splitting, in which an existing first cell of source base station eNB-1 may reduce its coverage while a new second cell of source base station eNB-1 is created to cover the remaining area left uncovered by the first cell. In this case, a new radiation pattern for all the cells that changed their coverage can be provided from the source node (e.g., base station eNB-1) serving the cells changing coverage to neighbor nodes (e.g., base station eNB-2).

If the radiation pattern information is associated with data channels, such as a Physical Downlink Shared Channel (PDSCH), the radiation pattern information about transmission power and transmission direction may be provided on a per cell per PRB basis. Moreover, this type of radiation pattern can be provided for use within a coordinated multipoint (CoMP) function to be able to signal between different RAN nodes the transmission power per cell and per PRB in a given transmission direction. In addition, this type of radiation pattern information can be provided to signal dynamic utilization of Time Division Duplex (TDD) resources. For example, the radiation pattern information may also be enhanced with information indicating the subframe number and configuration (UpLink UL or DownLink DL) of the subframe where the specified PRBs belong. The radiation pattern information may this convey not only the transmission power and transmission direction, but also whether the PRB was used for UL or DL and for what subframe the PRB was used.

The radiation pattern may also be enriched with time information associated with the list of PRBs for which transmission power and direction are specified, such as, a Transmission Time Interval (TTI) indication, a subframe indication, a radio frame indication, etc. This time information may help to specify different transmission configurations in time and therefore it may help to deduce how coverage maps change as time passes. Coordinated beamforming between nodes may be enabled. Moreover, this time information may be used in communications schemes other than TDD.

The radiation pattern information may be enriched with a cause value or in general a flag IE specifying a reason for the cell configuration change, as shown, for example, in FIGS. 8A and 8B by the Cause IE. The cause IE can take values already standardized as part of the cause IE used in existing procedures or it can take dedicated values such as causes indicating Coverage improvement/optimization, capacity improvement/optimization, cell shaping, cell splitting, load balancing, CoMP coordination, TDD configuration coordination, interference coordination, etc.

According to some other embodiments, the radiation pattern information may carry time validity information, for example, in the form of a validity time window. As an example, the time validity of the radiation pattern information may be long for cell shaping changes (given that cell shaping is an action likely not performed very frequently) and may be short for data channel related maps (given that UE specific beamforming for a data channel radiation pattern may change in a dynamic manner).

As discussed above, a transmitting (source) node (e.g., source base station eNB-1) may transmit 9-1 radiation pattern information relating to a RAN transmission, and a receiving node (e.g., base station eNB-2 neighboring source base station eNB-1) may receive 9-1 the radiation pattern information. The receiving node eNB-2 may thus act responsive to receiving the radiation pattern information based on understanding that the radiation pattern information refers to changes of cell configuration either with respect to common channels and/or to data channels. For example, new cell configurations may be determined for cells (e.g., Cell-2) neighboring the cell (e.g., Cell-1) associated with the signaled radiation pattern.

According to some embodiments, the receiving node eNB-2 may receive the radiation pattern information for a neighbor cell Cell-1 indicating changes in common channel transmissions (e.g., changes to cell shape). The receiving node eNB-2 that receives the radiation pattern information may determine a new cell configuration for one or more of its cells Cell-2 neighboring the cell Cell-1 whose shape changed. Such configuration may match the signaled radiation pattern information received in terms of overlapping coverage. For example, if the received radiation pattern information indicated an expansion of the neighbor cell Cell-1 of the transmitting (source) node eNB-1 and consequent increase of overlapping area between the neighboring cell Cell-1 and the cell Cell-2 served by the receiving node eNB-2, the receiving node eNB-2 may decide to reduce the coverage of its own cell(s) Cell-2 accordingly, to reduce/avoid performance degradation caused, for example, by cross cell interference and/or ping pong handovers. In addition, the receiving node eNB-2 (that receives the radiation pattern information and determines a matching cell configuration for its own cell Cell-2) may signal 9-2 radiation pattern information for its own cell(s) Cell-2 to the initial transmitting (source) node eNB-1. As shown in FIG. 9A, base station eNB-2 may signal the radiation pattern information directly to base station eNB-1. As shown in FIG. 9B, base station eNB-2 may signal 9-2a the radiation pattern information to control node 921, and control node 921 may signal 9-2b the radiation pattern information to base station eNB-1.

According to some embodiments, the receiving node eNB-2 that receives the radiation pattern information may determine that the changes imply cell order modification of Cell-1 and that this is done for the purpose of load balancing. The purpose of load balancing can be determined, for example, by monitoring cell load indication provided via X2 interface (e.g., Load Information messages over the X2 interface, Resource Status Report messages from node eNB-1 serving the neighbor cell Cell-1) which might reveal that the neighbor cell Cell-1 is in a situation of higher or lower load with respect to a cell/cells (e.g., Cell-2) of receiving node eNB-2. Alternatively, this can be determined using a cause value included in the message conveying the radiation pattern information. As a consequence of understanding that the cell coverage shape of Cell-1 has changed for load balancing reasons, receiving node eNB-2 may trigger mobility procedures for the UEs at an edge of cell Cell-2 with Cell-1 changing configuration, or receiving node eNB-2 may accept mobility from Cell-1 changing configuration. For example, if the neighboring cell Cell-1 has indicated a coverage expansion and if Cell-1 is underloaded with respect to neighboring Cell-2 of receiving node eNB-2, receiving node eNB-2 may trigger handovers of UEs towards the changing cell Cell-1 at an edge of Cell-2 adjacent Cell-1.

In other embodiments, receiving node eNB-2 may set mobility parameters accordingly for a cell/cells (e.g., Cell-2) that neighbor the cell/cells (e.g., Cell-1) subject to signaled changes responsive to receiving the radiation pattern information from neighboring node eNB-1. Such mobility parameters may take into consideration previous mobility failure events such as those monitored via MRO and may be set in a way to reduce/prevent occurrence of further failures.

In still other embodiments, receiving node eNB-2 receiving radiation pattern information may determine that the radiation pattern information is for a newly activated cell. This can be determined, for example, by checking the cell ID of the cell for which radiation pattern information was sent. Upon detecting a newly activated/created cell, receiving node eNB-2 can activate new neighbor relations with the newly created cell, and it can set opportune mobility thresholds with such cell.

In yet other embodiments, receiving node eNB-2 may determine that the radiation pattern information signaled by the sending (source) node eNB-1 refers to data channel(s) resource utilization, and receiving node eNB-2 may coordinate data channel utilization in served cells (e.g., Cell-2) of receiving node eNB-2 accordingly, responsive to the radiation pattern information.

For example, the data channel radiation pattern information may be used for interference coordination in time, frequency, and/or transmission direction. As an example of such coordination, the radiation pattern information may be used as part of a Coordinated Multi-Point (CoMP) function. More particularly, a resource allocation in the cell/cells (e.g., Cell-2) of receiving node eNB-2 within the neighborhood of the cell (e.g., Cell-1) for which the radiation pattern information was indicated can be derived in a way to reduce power in PRBs where neighbor nodes (e.g., eNB-1) need interference protection. Such power reduction may not need to be done for all transmission directions, but only for those directions where interference protection is needed/useful (e.g., only for the directions where the neighbor node's cells are using such resources with high transmission power). This may enable coordination of resource utilization between neighbor nodes. For example, node eNB-2 receiving radiation pattern information that a certain PRB is used with high transmission power in a given transmission direction might decide not to schedule UEs at a cell edge with the neighbor cell Cell-1 (and possibly in an intersecting transmission direction) on that resource to reduce/avoid cross cell interference.

Moreover, data channel radiation pattern information may be used for subframe configuration in TDD, both in time and space. According to some embodiments, dynamic configuration of TDD subframes may be possible in time but not in space. More particularly, in this embodiment, the adoption of an UL or DL configuration for TDD subframes for a given cell Cell-2 can be derived by the serving node eNB-2 depending on the transmission power, transmission direction, and resource utilization (UL or DL) indicated by a neighbor node eNB-1. For example, in one transmission direction, a node eNB-1 may indicate high transmission power and DL utilization. A receiving neighbor node eNB-2 may therefore decide to use resources in neighboring cells (e.g., Cell-2) and on intersecting transmission directions for UL transmission, to reduce/avoid DL interference. According to some embodiments, a radiation pattern can be determined for Cell-2 at node eNB-2 adapting to a TDD subframe configuration in time, frequency, and space based on radiation pattern information received from node eNB-1, and node eNB-2 can transmit radiation pattern information to node eNB-1 to indicate the new radiation pattern(s) of Cell-2.

According to some other embodiments, a central control (coordination) node 921 may receive radiation pattern information from different RAN nodes (e.g., base stations eNB-1 and eNB-2), and control node 921 may calculate cell configuration changes for many RAN nodes in a neighborhood. Such configurations can then be signaled to the RAN nodes. In the example of WCDMA technologies, control node 921 may be a Radio Network Controller RNC. In another example, control node 921 may reside in an OAM system. In another example, control node 921 may be based on a cloud concept(s) and may exist in a virtual environment using computational resources in a distributed way, depending on where resources are available.

Figure 10:
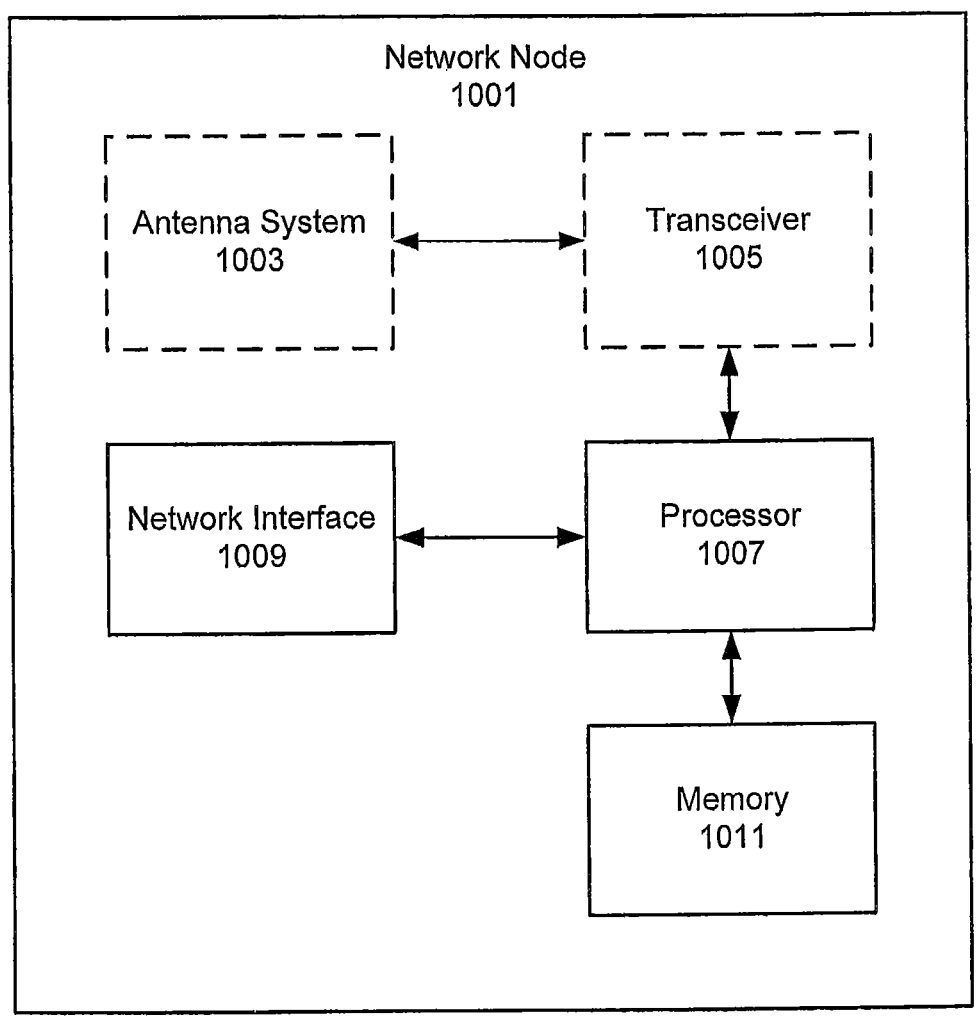
FIG. 10 is a block diagram illustrating a network node (e.g., a base station) according to some embodiments of inventive concepts.

FIG. 10 illustrates a network node 1001 (e.g., base station eNB-1 or eNB-2, or control node 921) according to some embodiments disclosed herein. According to operations of embodiments disclose herein, network node 1001 may include network interface 1009 (also referred to as communication circuitry) configured to communicate with other network nodes, transceiver 1005 (also referred to as radio circuitry) to communicate with mobile terminals via adaptive antenna system 1003, memory 1011 to store information related to embodiments/operations disclosed herein, and a processor 1007 (also referred to as a processing unit). According to some embodiments, processor 1007 is coupled to network interface 1009, transceiver 1005, and memory 1011, and transceiver 1005 is coupled to active antenna system 1003.

Processor 1007 may be configured to control transceiver 1005 and/or adaptive antenna system 1003 to change a cell shape, for example, based on information obtained from network interface 1009 and/or transceiver 1005, and/or based on control commands received from another network node through network interface 1009. Processor 1007 may also be configured to transmit radiation pattern information through network interface 1009 to another network node, to receive radiation pattern information through network interface 1009 from another network node, and/or to adapt operation of transceiver 1005 and/or antenna system 1003 to change a transmission power/direction responsive to radiation pattern information received through network interface 1009.

In FIG. 10, antenna system 1003 and transceiver 1005 are shown with dashed lines to illustrate different embodiments. For example, antenna system 1003 and transceiver 1005 may both be elements of a base station or eNB (so that all elements of FIG. 10 are co-located at/in a same unit). The antenna system 1003 and transceiver 1005 may be elements of an entity separate from the base station, such as a radio remote unit (also known as a radio remote head) implementing antenna systems and radio components and communicating with the base station (in this case referred to as a main unit). Transceiver 1005 may be part of the base station while antenna system 1003 is implemented in a separate unit, communicating with transceiver 1005 of the base station. According to some embodiments, network node 1001 may be a base station or eNB defined to include: all elements of FIG. 10 (located in a same unit or separated, for example, in a main unit and a radio remote unit); network interface 1009, processor 1007, memory 1011, and transceiver 1005 (with antenna system 1003 provided separately/remotely); and/or network interface 1009, processor 1007, and memory 1011 (with antenna system 1003 and transceiver 1005 provided separately/remotely). According to some other embodiments, network node 1001 may be a control node defined to include processor 1007, network interface 1009, and memory 1011, and omitting antenna system 1003 and transceiver 1005.

Figure 11A:
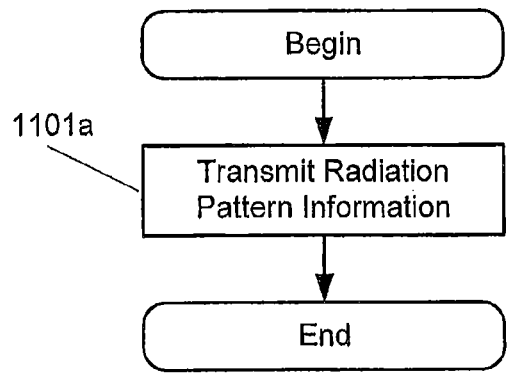
FIGS. 11A, 11B, and 11C are flow diagrams illustrating operations of transmitting radiation pattern information according to some embodiments of inventive concepts.

According to some embodiments illustrated in FIG. 11A, a processor 1007 of a first network node 1001 (e.g., base station eNB-1 and/or a control node 921) in a radio access network RAN may transmit radiation pattern information for a radio access network transmission through network interface 1009 to another network node (e.g., control node 921 and/or base station eNB-2) at block 1101a. More particularly, the radiation pattern information may include an indication of power and an indication of direction associated with the indication of power for the radio access network transmission.

Figure 11B:
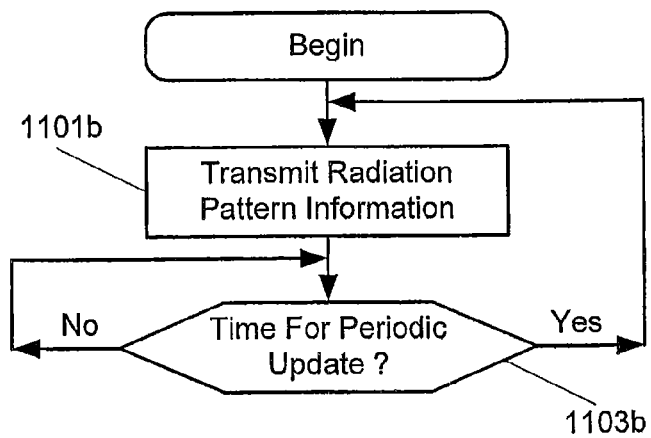

According to some embodiments illustrated in FIG. 11B, a processor 1007 of network node 1001 may transmit periodic updates of radiation pattern information for a same channel through network interface 1009 to another node of the Radio Access Network. More particularly, at block 1101b, processor 1107 may transmit first radiation pattern information for a first radio access network transmission through network interface 1009 to another node, and the first radiation pattern information may include a first indication of power and a first indication of direction associated with the first indication of power for the first radio access network transmission. At block 1103b, processor 1107 may wait for a next time for a periodic update before transmitting second radiation pattern information for a second radio access network transmission of the same channel. Once the time for periodic update has arrived at block 1103b, processor 1007 of network node 1001 may transmit second radiation pattern information for a second radio access network transmission through network interface 1009 to the other node at block 1101b. The second radiation pattern information may include a second indication of power and a second indication of direction associated with the second indication of power for the first radio access network transmission. Operations of blocks 1101b and 1103b may be repeated any number of times to provide any number of periodic updates of the radiation pattern information for the same channel.

Figure 11C:
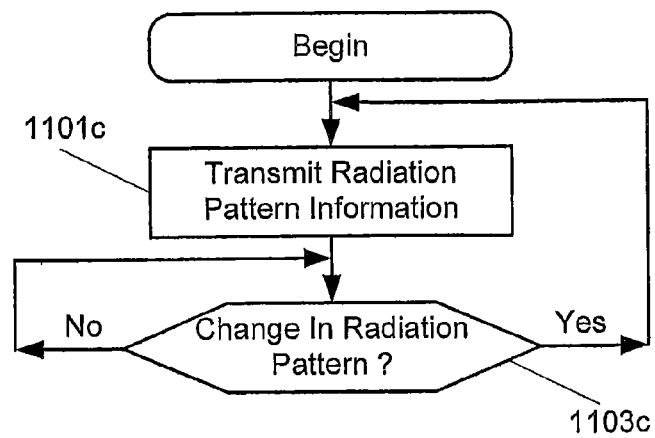

According to some embodiments illustrated in FIG. 11C, a processor 1007 of network node 1001 may transmit updates of radiation pattern information for a same channel through network interface 1009 to another node of the Radio Access Network responsive to changes in a radiation pattern for a same channel. More particularly, at block 1101c, processor 1107 may transmit first radiation pattern information for a first radio access network transmission through network interface 1009 to another node, and the first radiation pattern information may include a first indication of power and a first indication of direction associated with the first indication of power for the first radio access network transmission. At block 1103c, processor 1007 may wait for a sufficient change in power and/or direction of the radiation pattern before transmitting second radiation pattern information for a second radio access network transmission for the same channel. Processor 1007, for example, may wait for a change in power exceeding a power threshold, a change in elevation angle exceeding an elevation threshold, and/or a change in azimuth angle exceeding an azimuth threshold before triggering an update of the radiation pattern information. Once a sufficient change has been detected at block 1103c, processor 1007 of network node 1001 may transmit second radiation pattern information for a second radio access network transmission through network interface 1009 to the other node at block 1101c. The second radiation pattern information may include a second indication of power and a second indication of direction associated with the second indication of power for the first radio access network transmission. Operations of blocks 1101c and 1103c may be repeated any number of times to provide any number of updates of the radiation pattern information for the same channel.

The first radiation pattern information of either of blocks 1101b or 1101c may identify a first time resource and/or a first frequency resource for the first radio access network transmission, and the second radiation pattern information of either of blocks 1101b or 1101c may identify a second time resource and/or a second frequency resource for the second radio access network transmission.

The radiation pattern information of any of blocks 1101a, 1101b, or 1101c may be defined for a time resource and/or a frequency resource for the radio access network transmission.

The radiation pattern information of any of blocks 1101a, 1101b, or 1101c may be for a common channel transmitted by the first network node. For example, the common channel may be at least one of a cell reference signal (CRS), a broadcast channel (BCH), a physical downlink control channel (PDCCH), a physical control format indicator channel (PCFICH), and/or a physical hybrid ARQ indicator channel (PHICH).

The radiation pattern information of any of blocks 1101a, 1101b, or 1101c may be for a dedicated data and/or control channel transmitted by the first network node. For example, the dedicated data and/or control channel may be a physical downlink shared channel (PDSCH).

The radiation pattern information of block 1101a may identify a physical resource block PRB of the data channel. For example, the radiation pattern information may include an indication of at least one of a transmission time interval (TTI), a subframe, and/or a radio frame of the physical resource block of the data channel.

The radiation pattern information of any of blocks 1101a, 1101b, or 1101c may include a cause indication to identify a reason for transmission of the radiation pattern information.

The radiation pattern information of any of blocks 1101a, 1101b, or 1101c may include time validity information to define a time during which the radiation pattern information is valid and/or to define a time after which the radiation pattern information is invalid.

The indication of direction included in the radiation pattern information of any of blocks 1101a, 1101b, or 1101c may include an indication of an azimuth angle relative to a reference direction (e.g., relative to a reference compass direction such as north) and/or an indication of elevation defining an angle of elevation relative to a reference elevation (e.g., relative to a horizontal plane such as the horizon).

According to some embodiments, the first network node 1001 may be a source base station eNB-1 of FIG. 9A that transmits the radiation pattern information to another network node that is a receiving base station eNB-2 of the radio access network of FIG. 9A. According to some other embodiments, the first network node 1001 may be a source base station eNB-1 of FIG. 9B that transmits the radiation pattern information to another network node that is a control node 921 (e.g., an operation and maintenance O&M node) of the radio access network of FIG. 9B. According to still other embodiments, the first network node 1101 may be a control node 921 of the radio access network of FIG. 9B that transmits the radiation patter information to another network node that is a receiving base station eNB-2 of the radio access network of FIG. 9B.

The radiation pattern information of any of blocks 1101a, 1101b, or 1101c may be transmitted as an element of an X2AP message. For example, the X2AP message may include one of an X2AP mobility change request/acknowledge message, an X2AP eNB configuration update request/acknowledge message, an X2AP Setup request/response message, an X2AP resource status request/response/update message, and/or an X2AP load information message.

Moreover, the radiation pattern information of any of blocks 1101a, 1101b, or 1101c may include a plurality of indications of power and respective indications of direction.

According to some embodiments illustrated in FIG. 12A, processor 1007 of a first network node 1001 (e.g., base station eNB-2) may receive radiation pattern information for a radio access network transmission from a second node (e.g., base station eNB-1) through network interface 1009 at blocks 1201a and 1203a. More particularly, the radiation pattern information may include an indication of power and an indication of direction associated with the indication of power for the radio access network transmission. Responsive to receiving the radiation pattern information, processor 1007 may determine a new configuration for a cell (e.g., Cell-2) neighboring a base station (e.g., base station eNB-1) associated with the radiation pattern information at block 1205a.

Determining the new configuration at block 1205a may include determining a configuration of a common channel of the cell (e.g., Cell-2) neighboring the base station (e.g., base station eNB-1) based on the radiation pattern information for the radio access network transmission from the base station (e.g., base station eNB-1). In some embodiments, determining the configuration of the common channel may include reducing a power of the common channel in at least one direction responsive to the to the radiation pattern information indicating an increase in power of the radio access network transmission from the base station (e.g., base station eNB-1), and/or determining the configuration of the common channel may include increasing a power of the common channel in at least one direction responsive to the to the radiation pattern information indicating an decrease in power of the radio access network transmission from the base station (e.g., base station eNB-1).

According to some embodiments illustrated in FIG. 12B, processor 1007 of a first network node 1001 (e.g., base station eNB-2) may receive radiation pattern information for a radio access network transmission from a second node (e.g., base station eNB-1) through network interface 1009 at blocks 1201b and 1203b. More particularly, the radiation pattern information may include an indication of power and an indication of direction associated with the indication of power for the radio access network transmission. Responsive to determining that the radiation pattern information was transmitted for purposes of load balancing at block 1204b, processor 1007 may change mobility parameters for a cell (e.g., Cell-2) neighboring a node (e.g., base station eNB-1) associated with the radiation pattern information at block 1205b. For example, the radiation pattern information may include a cause indication to indicate a reason for transmission of the radiation pattern information, and processor 1001 may use the cause indication at block 1204b to determine that the radiation pattern information was transmitted for purposes of load balancing.

According to some embodiments illustrated in FIG. 12C, processor 1007 of a first network node 1001 (e.g., base station eNB-2) may receive a cell load indication through network interface 1009 at blocks 1211c and 1213c, and the cell load indication may indicate a load of another network node (e.g., base station eNB-1). Processor 1007 of the first network node 1001 (e.g., base station eNB-2) may receive radiation pattern information for a radio access network transmission from a second node (e.g., base station eNB-1) through network interface 1009 at blocks 1201c and 1203c. More particularly, the radiation pattern information may include an indication of power and an indication of direction associated with the indication of power for the radio access network transmission. Moreover, the cell load indication and the radiation pattern information may both be associated with a same cell (e.g., Cell-1) of a same base station (e.g., base station eNB-1). Responsive to determining that the radiation pattern information was transmitted for purposes of load balancing at block 1204c, processor 1007 may change mobility parameters for a cell (e.g., Cell-2) neighboring a node (e.g., base station eNB-1) associated with the radiation pattern information at block 1205c. More particularly, processor 1007 may use the cell load indication (received at blocks 1211c and 1213c) to determine at block 1204c that the radiation pattern information was transmitted for purposes of load balancing.

Changing mobility parameters at either of blocks 1205b or 1205c may include triggering handovers from the cell (e.g., Cell-2) neighboring the node (e.g., base station eNB-1) associated with the radiation pattern information to the node (e.g., base station eNB-1) associated with the radiation pattern information responsive to an increase in coverage area of the node (eNB-1) associated with the radiation pattern information.

Changing mobility parameters at either of blocks 1205b or 1205c may include accepting handovers from the node (e.g., base station eNB-1) associated with the radiation pattern information at the cell (e.g., Cell-2) neighboring the node (e.g., base station eNB-1) associated with the radiation pattern information responsive to a decrease in coverage area of the node (eNB-1) associated with the radiation pattern information.

The second node may be a base station (e.g., base station eNB-1) associated with the radiation pattern information, or the second node may be a control node 921.

Figure 12E:
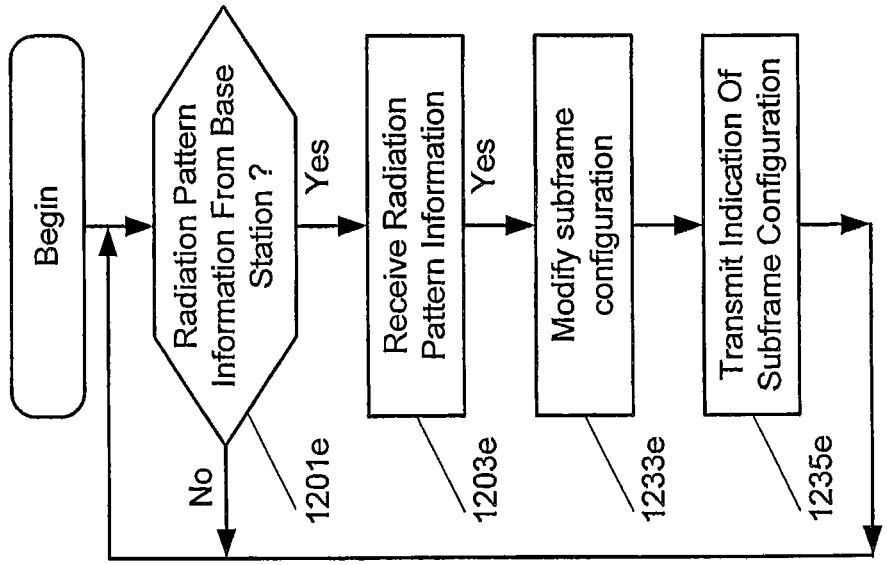
Figure 12D:
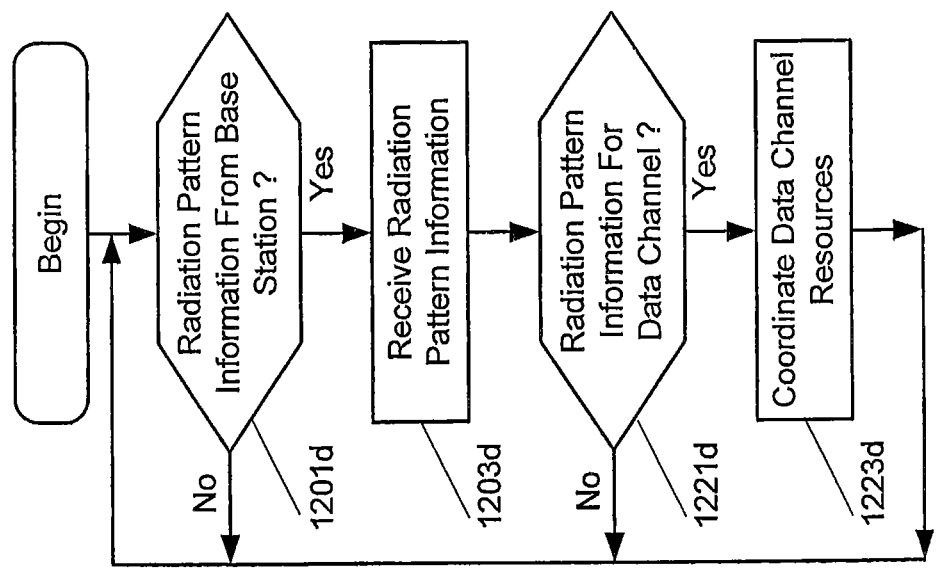

According to some embodiments illustrated in FIG. 12D, processor 1007 of a first network node 1001 (e.g., base station eNB-2) may receive radiation pattern information for a radio access network transmission from a second node (e.g., base station eNB-1) through network interface 1009 at blocks 1201d and 1203d. More particularly, the radiation pattern information may include an indication of power and an indication of direction associated with the indication of power for the radio access network transmission. Responsive to determining that the radiation pattern information is for data channel resource utilization at block 1221d, processor 1007 may coordinating (1223d) data channel resource utilization for a cell (e.g., Cell-2) neighboring a node (e.g., base station eNB-1) associated with the radiation pattern information at block 1223d.

According to some embodiments illustrated in FIG. 12F, processor 1007 of a first network node 1001 (e.g., base station eNB-2) may receive radiation pattern information for a radio access network transmission from a second node (e.g., base station eNB-1) through network interface 1009 at blocks 1201f and 1203f. More particularly, the radiation pattern information may include an indication of power and an indication of direction associated with the indication of power for the radio access network transmission. Responsive to determining that the radiation pattern information is for a new cell supported by the a node (e.g., base station eNB-1) associated with the radiation pattern information at block 1221f, processor 1007 may set mobility thresholds for a cell (e.g., Cell-2) neighboring the node (e.g., base station eNB-1) associated with the radiation pattern information at block 1223f.

According to some embodiments illustrated in FIG. 12E, processor 1007 of a first network node 1001 (e.g., base station eNB-2) may receive radiation pattern information for a radio access network transmission from a second node (e.g., base station eNB-1) through network interface 1009 at blocks 1201e and 1203e. More particularly, the radiation pattern information may include an indication of power and an indication of direction associated with the indication of power for the radio access network transmission. At block 1233e, processor 1007 may modify a subframe configuration in time division duplex (TDD) for a cell (e.g., Cell-2) neighboring a node (e.g., base station eNB-1) associated with the radiation pattern information. At block 1235e, processor 1007 may transmit an indication of the subframe configuration in time division duplex to the second node (e.g., to base station eNB-1). Modifying the subframe at block 1233e may include allocating conflicting resources to uplink transmissions along the direction for the radio access network transmission.

According to embodiments of FIGS. 12A, 12B, 12C, 12D, 12E, and 12F, the first node may be a first base station (e.g., base station eNB-2) and the second node may be a second base station (e.g., base station eNB-1), and receiving the radiation pattern information may include receiving the radiation pattern information for the radio access network transmission from the second base station (e.g., base station eNB-1). According to some other embodiments of FIGS. 12A, 12B, 12C, 12D, 12E, and 12F, the first node may be a central control node (e.g., control node 921), and receiving the radiation pattern information for the radio access network transmission may include receiving the radiation pattern information at the central control node from a base station (e.g., base station eNB-1) associated with the radiation pattern information. According to still other embodiments FIGS. 12A, 12B, 12C, 12D, 12E, and 12F, the first node may be a base station (e.g., base station eNB-2), and receiving the radiation pattern information for the radio access network transmission may include receiving the radiation pattern information at the base station from a central control node (e.g., control node 921).

The radiation pattern information of blocks 1203a-f may be defined for a time resource and/or a frequency resource for the radio access network transmission, and/or the radiation pattern information of blocks 1203a-f may be for a common channel transmitted in accordance with the radiation pattern information. The radiation pattern information of blocks 1203a-f may be for a dedicated data and/or control channel transmitted in accordance with the radiation pattern information. The indication of direction of the radiation pattern information of blocks 1203a-f may include an indication of an azimuth angel relative to a reference direction and/or an indication of elevation defining an angle of elevation relative to a reference elevation. The radiation pattern information of blocks 1203a-f may include time validity information to define a time during which the radiation pattern information is valid and/or to define a time after which the radiation pattern information is invalid. The radiation pattern information of blocks 1203a-f for the radio access network transmission may include a plurality of indications of power and respective indications of direction.

Further Definitions

Although terminology from 3GPP has been used herein with respect to some embodiments of inventive concepts, this terminology should not be seen as limiting the scope of inventive concepts to 3GPP systems/methods. Embodiments of inventive concepts may be implemented, for example, in/using other wireless technologies such as WCDMA, WiMax, UMB, GSM, etc. Moreover, where embodiments disclosed herein are discussed using terminology such as eNodeB (also referred to as a radio access network node, base station, etc.) and UE (also referred to as a wireless terminal), these embodiments should be considered as non-limiting and without implying a certain hierarchical relation. In such embodiments, the eNodeB could be considered as a first device and the UE could be considered as a second device, with communications according to some embodiments being provided in either direction between the two devices. In addition, where embodiments are disclosed using signaling over an X2 backhaul, such embodiments are not limited to communications between eNodeBs, but the communicating nodes may be any radio access network node terminating the backhaul interface over which the information described is transmitted.

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processing unit and/or processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry." "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, and be within the scope of the present inventive concepts. Moreover, it is intended that all embodiments disclosed herein can be implemented separately or combined in any way and/or combination.

That which is claimed is:

1. A method of operating a first base station in a radio access network (RAN) including a plurality of base stations, the method comprising:
receiving radiation pattern information of a radio access network transmission of a second base station in the radio access network, wherein the radiation pattern information is received at the first base station in the radio access network from a node in the radio access network, wherein the radiation pattern information includes an indication of power and an indication of direction associated with the indication of power of the radio access network transmission of the second base station in the radio access network; and
responsive to receiving the radiation pattern information, determining a new configuration of a cell of the first base station neighboring the second base station associated with the radiation pattern information, wherein determining the new configuration comprises determining a new configuration of a common channel of the cell of the first base station neighboring the second base station associated with the radiation pattern information based on the radiation pattern information of the radio access network transmission from the second base station.

2. The method of claim 1 wherein determining the configuration of the common channel comprises reducing a power of the common channel to a reduced transmission power in at least one direction from the first node responsive to the to the radiation pattern information indicating an increase in power of the radio access network transmission of the base station, the method further comprising:
transmitting the common channel using the reduced transmission power in the at least one direction from the first node based on determining the configuration.

3. The method of claim 1 wherein determining the configuration of the common channel comprises increasing a power of the common channel to an increased transmission power in at least one direction from the first node responsive to the to the radiation pattern information indicating a decrease in power of the radio access network transmission of the base station, the method further comprising:
transmitting the common channel using the increased transmission power in the at least one direction from the first node based on determining the configuration.

4. The method of claim 1 wherein the node comprises the second base station associated with the radiation pattern information.

5. The method of claim 1 further comprising:
responsive to determining that the radiation pattern information was transmitted by the node to provide load balancing, changing mobility parameters of a cell of the first base station neighboring the second base station associated with the radiation pattern information based on determining that the radio pattern information was transmitted to provide load balancing; and
performing handovers between the first and second base stations based on changing the mobility parameters.

6. The method of claim 5 wherein performing handovers comprises triggering handovers from the cell of the first base station neighboring the second base station associated with the radiation pattern information to the second base station associated with the radiation pattern information responsive to an increase in coverage area of the second base station associated with the radiation pattern information.

7. The method of claim 5 wherein performing handovers comprises accepting handovers from the second base station associated with the radiation pattern information at the cell of the first base station neighboring the second base station associated with the radiation pattern information responsive to a decrease in coverage area of the second base station associated with the radiation pattern information.

8. The method of claim 5 wherein the node comprises the second base station associated with the radiation pattern information.

9. The method of claim 5 wherein the radiation pattern information includes a cause indication to indicate a reason to transmit the radiation pattern information, the method further comprising:
using the cause indication at the first base station to determine that the radiation pattern information was transmitted from the node to provide load balancing.

10. The method of claim 5 further comprising:

receiving a cell load indication at the first base station, wherein the cell load indication indicates a load of the second base station associated with the radiation pattern information; and using the cell load indication at the first base station to determine that the radiation pattern information was transmitted by the node to provide load balancing.

11. The method of claim 1 further comprising:
responsive to the radiation pattern information relating to a new cell supported by the second base station associated with the radiation pattern information, setting mobility thresholds of a cell of the first base station neighboring the second base station associated with the radiation pattern information based on the radiation pattern information relating to the new cell.

12. The method of claim 1 further comprising:
responsive to the radiation pattern information relating to data channel resource utilization, coordinating data channel resource utilization of a cell of the first base station neighboring the second base station associated with the radiation pattern information based on the radiation pattern information relating to data channel resource utilization.

13. The method of claim 1 further comprising:
modifying a subframe configuration in time division duplex (TDD) of a cell of the first base station neighboring the second base station associated with the radiation pattern information.

14. The method of claim 13 further comprising:
transmitting an indication of the subframe configuration in time division duplex from the first base station to the node.

15. The method of claim 13 wherein modifying the subframe comprises allocating conflicting resources of the cell of the first base station to uplink transmissions along the direction of the radio access network transmission.

16. The method of claim 1, wherein the radiation pattern information is defined for a time resource and/or a frequency resource of the radio access network transmission of the second base station.

17. The method of claim 1 wherein the radiation pattern information is radiation pattern information of a common channel transmitted from the second base station in accordance with the radiation pattern information and wherein the common channel comprises at least one of a cell reference signal (CRS), a broadcast channel (BCH), a physical downlink control channel (PDCCH), a physical control format indicator channel (PCFICH), and/or a physical hybrid ARQ indicator channel (PHICH).

18. The method of claim 1 wherein the radiation pattern information is radiation pattern information of a dedicated data and/or control channel transmitted from the second base station in accordance with the radiation pattern information.

19. The method of claim 1 wherein the indication of direction includes an indication of an azimuth angel relative to a reference direction.

20. The method of claim 1 wherein the indication of direction includes an indication of elevation defining an angle of elevation relative to a reference elevation.

21. The method of claim 1 wherein the radiation pattern information includes time validity information to define a time during which the radiation pattern information is valid and/or to define a time after which the radiation pattern information is invalid.

22. The method of claim 1 wherein the radiation pattern information of the radio access network transmission includes a plurality of indications of power and respective indications of direction.

23. The method of claim 1 wherein the common channel of the cell of the first base station comprises at least one of a cell reference signal (CRS), a broadcast channel (BCH), a physical downlink control channel (PDCCH), a physical control format indicator channel (PCFICH), and/or a physical hybrid ARQ indicator channel (PHICH).

24. The method of claim 23, wherein determining the new configuration of the common channel of the cell of the first base station comprises changing a transmission power of the common channel of the first base station to a new transmission power, the method further comprising:
transmitting the common channel of the cell of the first base station using the new transmission power.

25. A first base station in a radio access network (RAN) including a plurality of base stations, the first base station comprising:
a network interface; and
a processor coupled to the network interface, the processor being configured to receive radiation pattern information of a radio access network transmission of a second base station in the radio access network, wherein the radiation pattern information is received at the first base station from a second node though the network interface of the first base station, and wherein the radiation pattern information includes an indication of power and an indication of direction associated with the indication of power of the radio access network transmission of the second base station in the radio access network, the processor being further configured to determine a new configuration of a cell of the first base station neighboring the second base station associated with the radiation pattern information responsive to receiving the radiation pattern information, wherein determining the new configuration comprises determining a new configuration of a common channel of the cell of the first base station neighboring the second base station associated with the radiation pattern information based on the radiation pattern information of the radio access network transmission from the second base station.

26. The first base station node of claim 25 further comprising:
an antenna system comprising a plurality of antenna elements; and
a transceiver coupled between the processor and the antenna system;
wherein the processor is configured to received the radiation pattern information of the radio access network transmission from the second node through the network interface.

27. The first base station of claim 25 wherein the common channel of the cell of the first base station comprises at least one of a cell reference signal (CRS), a broadcast channel (BCH), a physical downlink control channel (PDCCH), a physical control format indicator channel (PCFICH), and/or a physical hybrid ARQ indicator channel (PHICH).

28. The first base station of claim 27 wherein determining the new configuration of the common channel of the cell of the first base station comprises changing a transmission power of the common channel of the first base station to a new transmission power, and wherein the processor is further configured to transmit the common channel of the cell of the first base station using the new transmission power.

29. The first base station of claim 25 wherein the radiation pattern information of the radio access network transmission includes a plurality of indications of power and respective indications of direction.

\* \* \* \* \*